(12) United States Patent
Kawai et al.

(10) Patent No.: US 11,074,937 B1
(45) Date of Patent: Jul. 27, 2021

(54) MAGNETIC DISK DEVICE AND DEPOP PROCESSING METHOD

(71) Applicants: Kabushiki Kaisha Toshiba, Tokyo (JP); Toshiba Electronic Devices & Storage Corporation, Tokyo (JP)

(72) Inventors: Takahiro Kawai, Yokohama Kanagawa (JP); Tatsuo Nitta, Machida Tokyo (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 17/017,144

(22) Filed: Sep. 10, 2020

(30) Foreign Application Priority Data

Mar. 17, 2020 (JP) .............................. JP2020-046735

(51) Int. Cl.
| | |
|---|---|
| *G11B 5/09* | (2006.01) |
| *G11B 20/12* | (2006.01) |
| *G11B 20/18* | (2006.01) |
| *G11B 5/48* | (2006.01) |
| *G06F 12/02* | (2006.01) |

(52) U.S. Cl.
CPC ........ *G11B 20/1258* (2013.01); *G11B 5/4813* (2013.01); *G11B 20/1833* (2013.01); *G06F 12/0223* (2013.01); *G06F 2212/21* (2013.01)

(58) Field of Classification Search
None
See application file for complete search history.

(56) References Cited

U.S. PATENT DOCUMENTS

| | | | |
|---|---|---|---|
| 6,446,156 B1 | 9/2002 | Chia et al. | |
| 7,752,491 B1* | 7/2010 | Liikanen | G11B 20/1883 714/6.13 |
| 8,194,341 B1* | 6/2012 | Boyle | G11B 5/09 360/53 |
| 8,699,175 B1* | 4/2014 | Olds | G11B 5/012 360/78.14 |
| 8,867,153 B1* | 10/2014 | Coker | G11B 20/10009 360/31 |
| 8,976,478 B1* | 3/2015 | Harllee, III | G11B 20/1879 360/53 |
| 9,036,284 B1* | 5/2015 | Feldman | G11B 20/1217 360/48 |
| 9,240,198 B1* | 1/2016 | Hara | G11B 5/59627 |
| 9,281,008 B1* | 3/2016 | Harllee, III | G11B 20/00601 |
| 10,037,778 B1* | 7/2018 | Farhan | G11B 27/329 |
| 10,090,016 B2 | 10/2018 | Gao et al. | |
| 2012/0307400 A1* | 12/2012 | Kawabe | G11B 5/012 360/77.01 |

(Continued)

Primary Examiner — Peter Vincent Agustin
(74) Attorney, Agent, or Firm — White & Case LLP

(57) ABSTRACT

According to one embodiment, a magnetic disk device includes a plurality of disks including a first area to which data is randomly written in normal recording and to which an LBA is added, and a second area to which data is written in shingled recording to write a plurality of tracks overlaid in a radial direction and to which an LBA is added, a plurality of heads, and a controller which writes data to the first area in the normal recording, writes data to the second area in the shingled recording, and changes the first area in accordance with a first recording capacity of a first recording surface in each of the disks, which corresponds to a first head of the heads, when the first head is inhibited from being used.

20 Claims, 18 Drawing Sheets

(56) References Cited

U.S. PATENT DOCUMENTS

| | | | |
|---|---|---|---|
| 2015/0254135 A1* | 9/2015 | Chatradhi | H03M 13/353 714/764 |
| 2015/0363126 A1* | 12/2015 | Frick | G06F 3/0658 711/114 |
| 2016/0012850 A1* | 1/2016 | Feldman | G11B 20/1217 360/48 |
| 2019/0066715 A1 | 2/2019 | Aoki | |

* cited by examiner

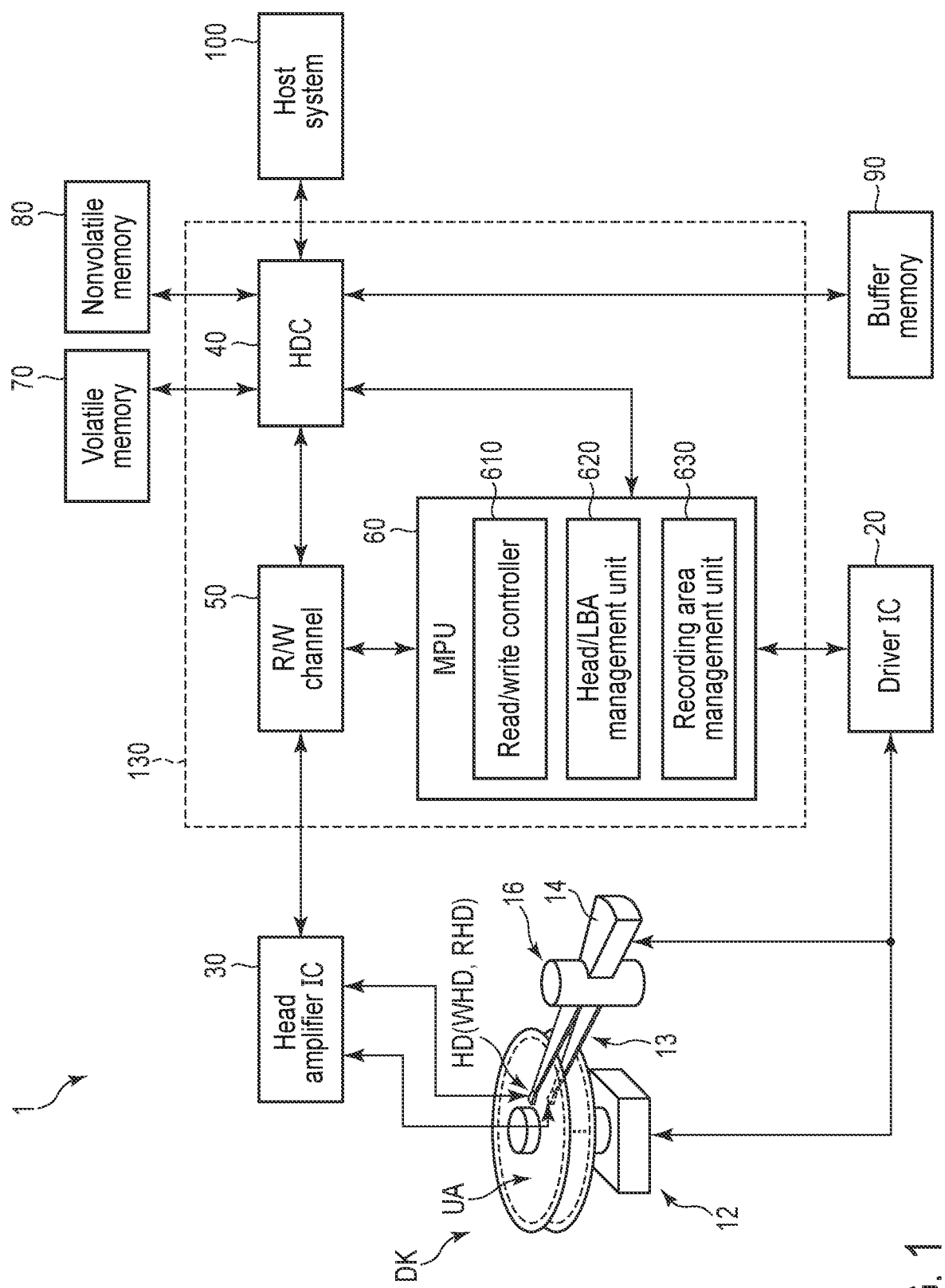
F I G. 1

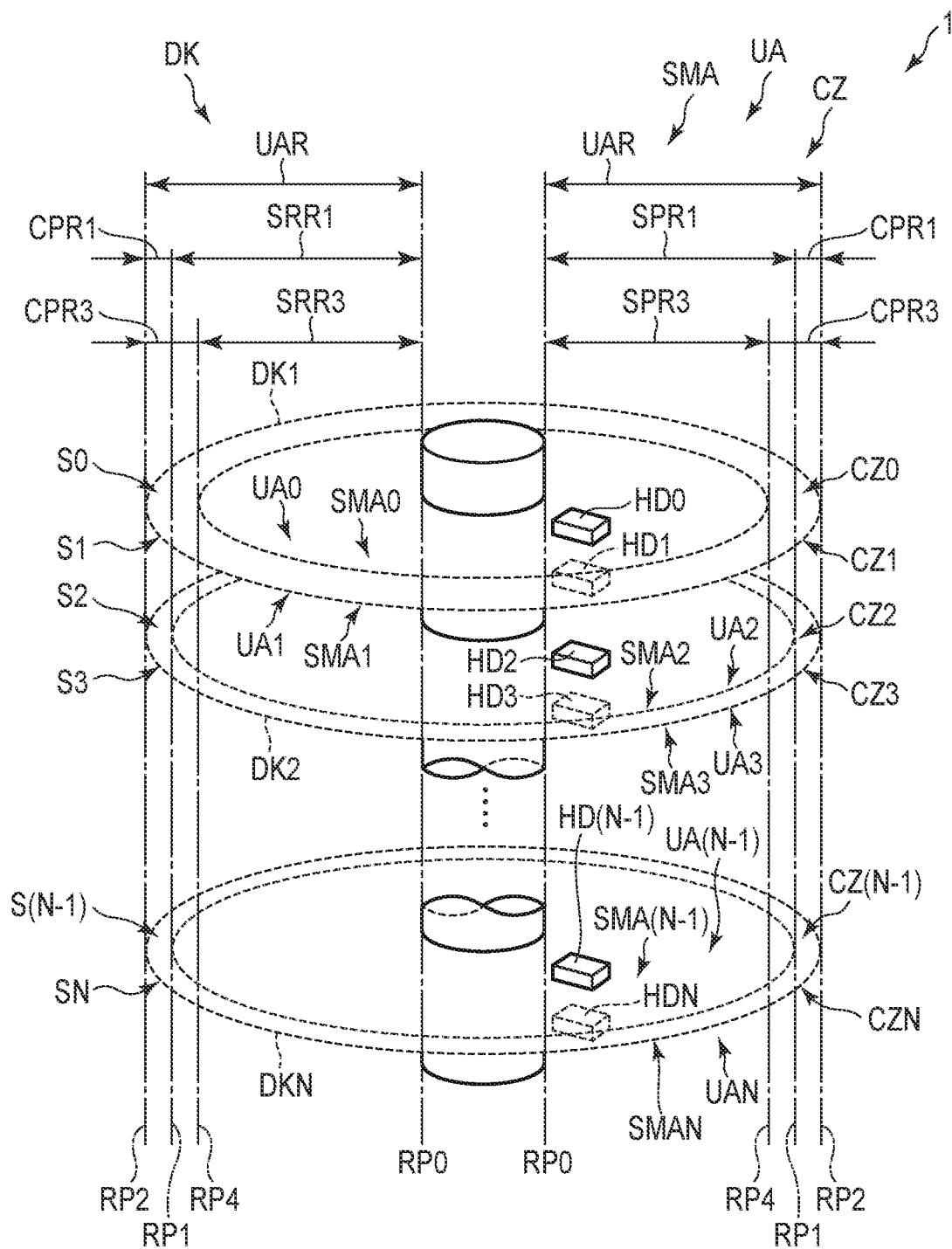
F I G. 8

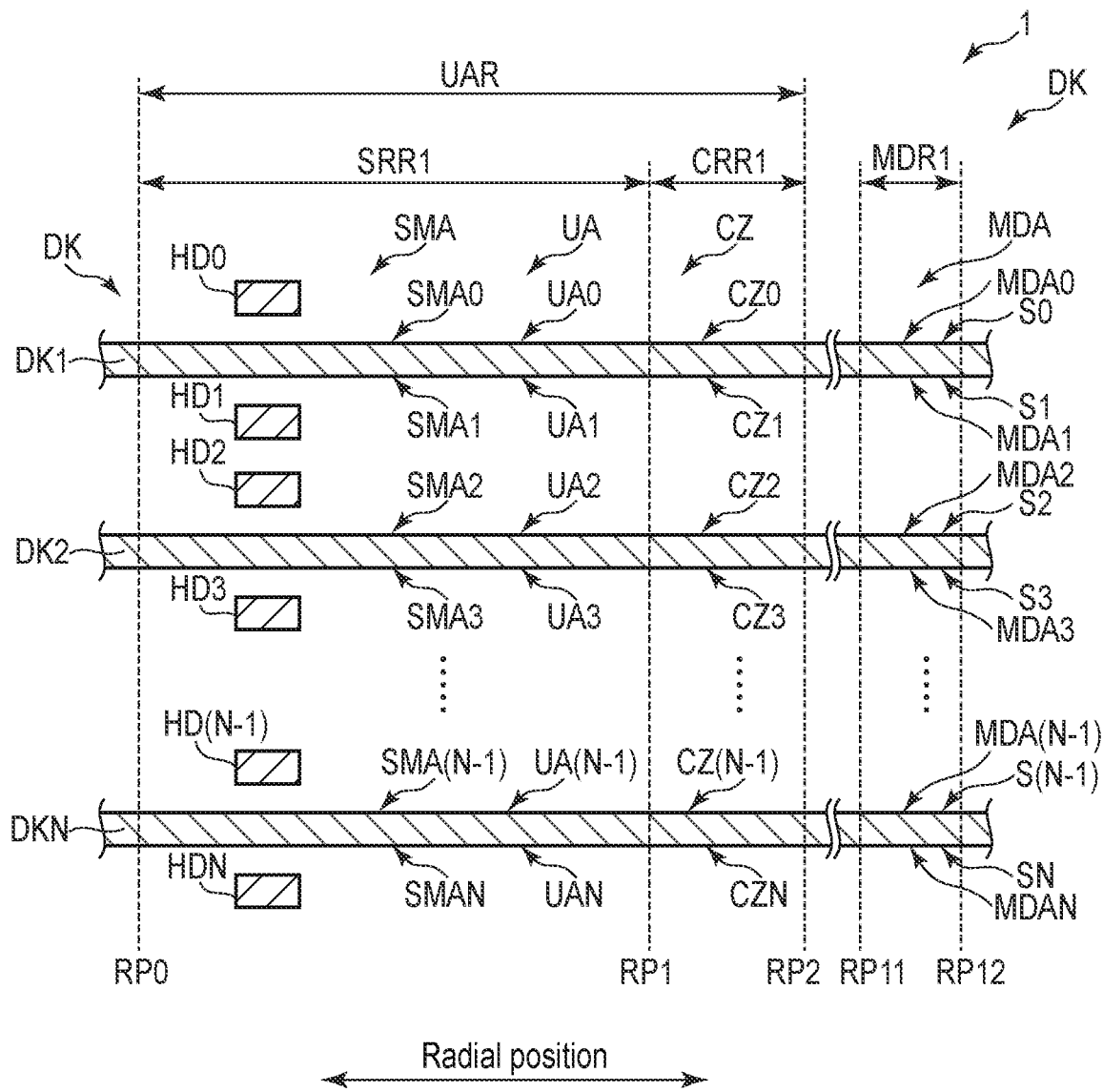
F I G. 15

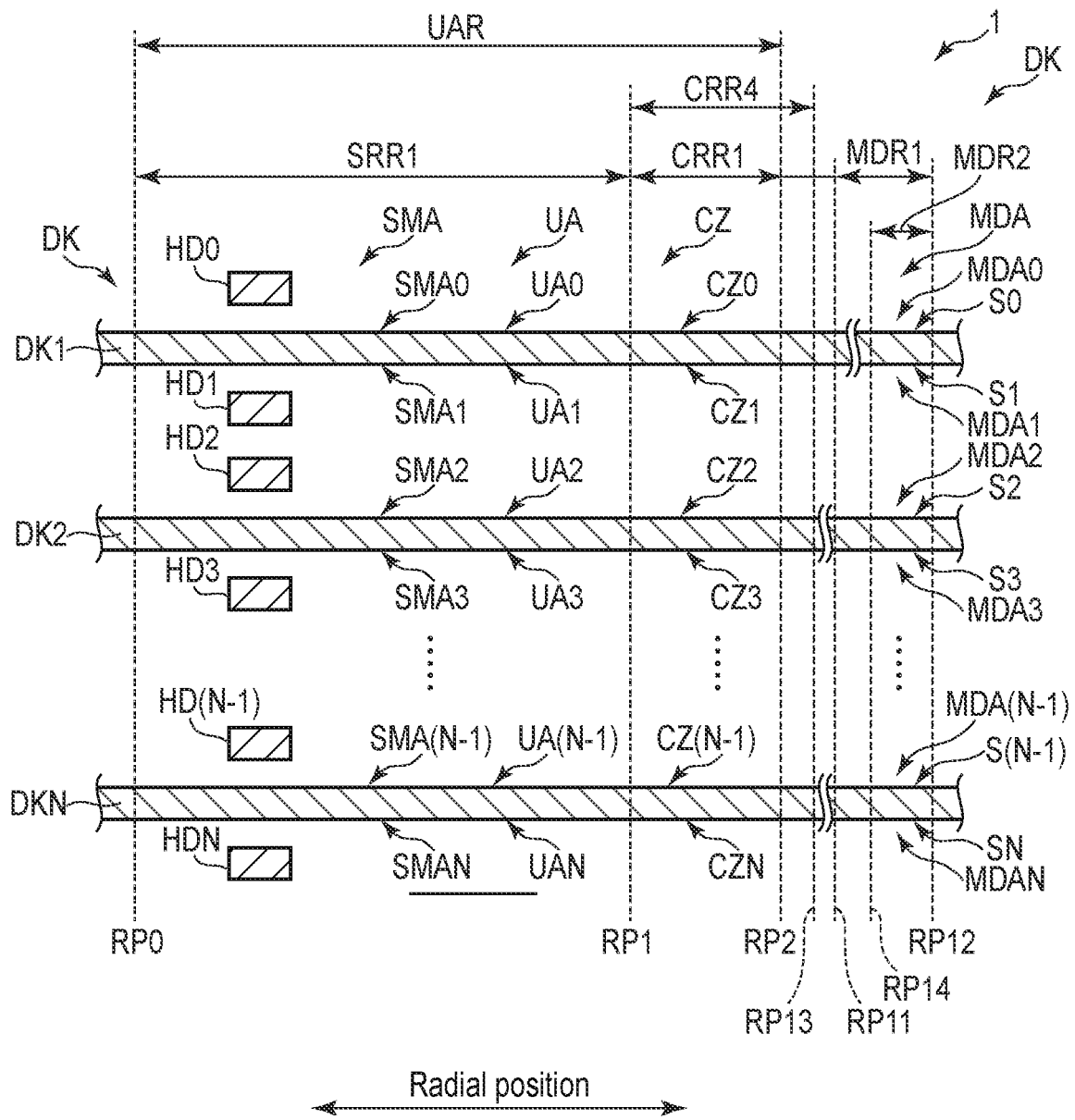
F I G. 16

MAGNETIC DISK DEVICE AND DEPOP PROCESSING METHOD

CROSS-REFERENCE TO RELATED APPLICATIONS

This application is based upon and claims the benefit of priority from Japanese Patent Application No. 2020-046735, filed Mar. 17, 2020, the entire contents of which are incorporated herein by reference.

FIELD

Embodiments described herein relate generally to a magnetic disk device and a Depop processing method.

BACKGROUND

In recent years, magnetic disk devices using a technology to achieve high packing density have been developed. The magnetic disk devices include a magnetic disk device of a shingled write magnetic recording (SMR) type or a shingled write recording (SWR) type which overwrites a plurality of tracks in the radial direction of a disk. They also include a magnetic disk device of an SMR or SWR type having a logical depopulation (Logical Depop) function of inhibiting a head from being used due to its deterioration, trouble or the like and changing the relationship in correspondence between the logical block address (LBA) and the physical address of each sector of a disk.

BRIEF DESCRIPTION OF THE DRAWINGS

FIG. 1 is block diagram showing a configuration of a magnetic disk device according to a first embodiment.

FIG. 8 is a schematic diagram showing another example of the user data area in the case where the Depop function according to the first embodiment is performed.

FIG. 15 is a diagram showing an example of a memory area according to a second embodiment.

FIG. 16 is a schematic diagram showing an example of a memory area when a Depop function according to the second embodiment is performed.

DETAILED DESCRIPTION

Figure 2:
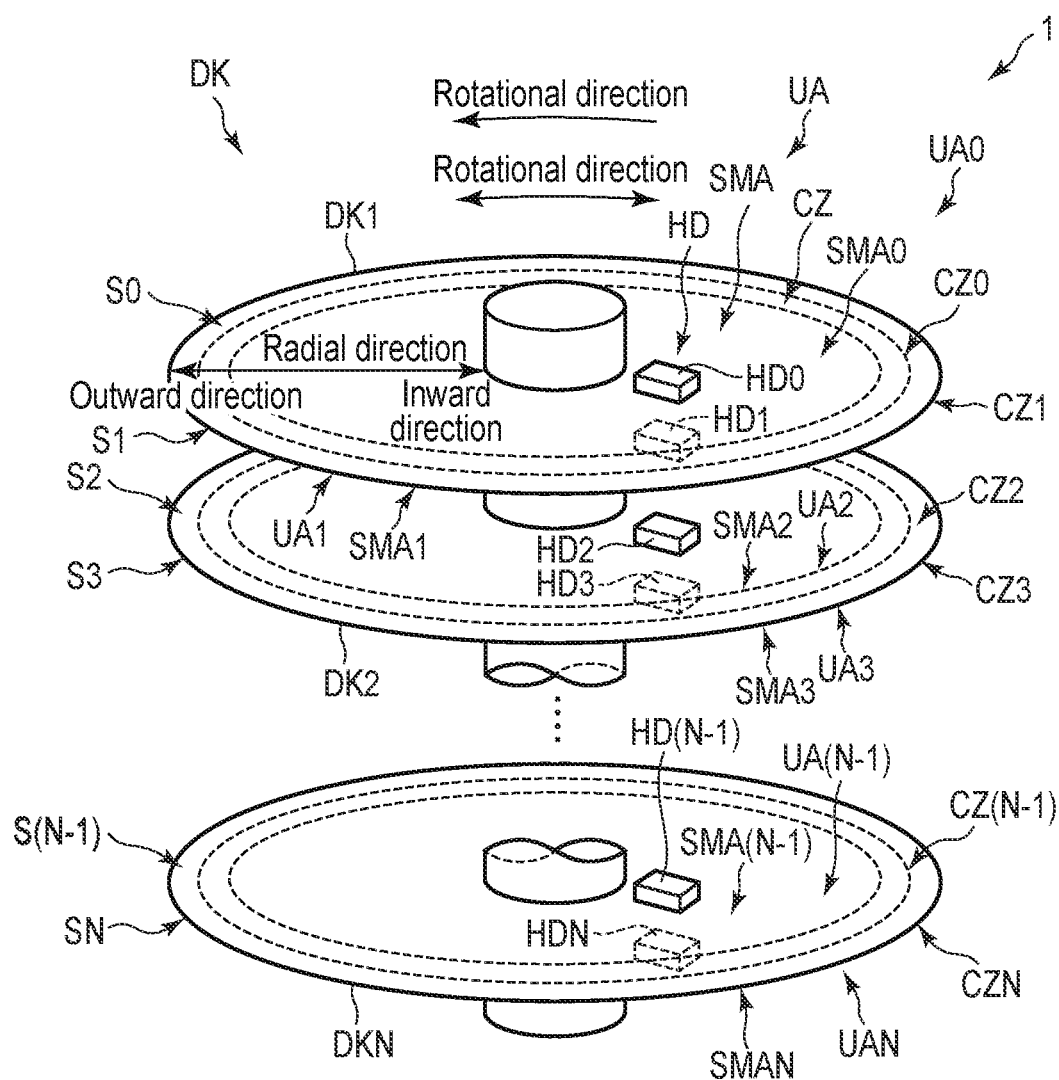
FIG. 2 is a schematic diagram showing an example of placement of a head with respect to a disk according to the first embodiment.

In general, according to one embodiment, a magnetic disk device comprises: a plurality of disks including a first area to which data is randomly written in normal recording and to which an LBA is added, and a second area to which data is written in shingled recording to write a plurality of tracks overlaid in a radial direction and to which an LBA is added; a plurality of heads with which data is written to each of the disks and data is read from each of the disks; and a controller which writes data to the first area in the normal recording, writes data to the second area in the shingled recording, and changes the first area in accordance with a first recording capacity of a first recording surface in each of the disks, which corresponds to a first head of the heads, when the first head is inhibited from being used.

Embodiments will be described below with reference to the accompanying drawings. Note that the drawings are one example and do not limit the scope of the invention.

First Embodiment

FIG. 1 is block diagram showing a configuration of a magnetic disk device 1 according to a first embodiment.

The magnetic disk device 1 includes a head disk assembly (HDA), a driver IC 20, a head amplifier integrated circuit (referred to as a head amplifier IC or a preamplifier hereinafter) 30, a volatile memory 70, a nonvolatile memory 80, a buffer memory (buffer) 90, and a system controller 130 that is a one-chip integrated circuit, which will be described later. The magnetic disk device 1 is connected to a host system (referred to simply as a host hereinafter) 100.

The HDA includes a magnetic disk (referred to as a disk hereinafter) DK, a spindle motor (referred to as an SPM hereinafter) 12, an arm 13 mounted with a head HD, and a voice coil motor (referred to as a VCM hereinafter) 14. The disk DK includes at least one disk DK. For example, the disk DK includes a plurality of disks DK. The disk DK is attached to the SPM 12 and is rotated by driving the SPM 12. The arm 13 and the VCM 14 constitute an actuator 16. The arm 13 includes at least one arm 13. For example, the arm 13 includes a plurality of arms 13. The head HD includes at least one head HD. For example, the head HD includes a plurality of heads HD. As the VCM 14 is driven, the actuator 16 controls and moves the head HD of the arm 13 to a particular position of the disk DK. Two or more actuators 16 may be provided.

The disk DK has a recording surface on the front side (which may be referred to as a front surface hereinafter) and a recording surface on the back side opposite to the front side (which may be referred to as a back surface hereinafter). In the case of a plurality of disks DK, too, each of them has a front surface and a back surface. Hereinafter, the front surface and the back surface may be referred to as a recording surface. The recording surface of the disk DK may be referred to simply as a disk DK.

The disk DK is allocated a user data area UA that is available from a user as an area to which data can be written. Note that the disk DK may be allocated an area for temporarily holding data (or command) transferred from a host and the like before it is written to a particular area of the user data area UA, and a system area for writing information necessary for system management. Hereinafter, the direction from the inner circumference of the disk DK toward the outer circumference thereof or the direction from the outer circumference of the disk DK toward the inner circumference thereof will be referred to as a radial direction. In the radial direction, the direction from the inner circumference toward the outer circumference will be referred to as an outward direction (outside), and the direction from the outer circumference toward the inner circumference will be referred to as an inward direction (inside). The direction perpendicular to the radial direction of the disk DK will be referred to as a circumferential direction. The circumferential direction corresponds to a direction along the circumference of the disk DK. A particular position of the disk DK in its radial direction may be referred to as a radial position, and a particular position of the disk DK in its circumferential direction may be referred to as a circumferential position. The radial position and the circumferential position may collectively be referred to simply as a position.

The disk DK is divided into a plurality of areas (which may be referred to as zones or zone areas) for each range particular in the radial direction. The zones each include a plurality of tracks. The tracks each include a plurality of sectors. Note that the term "track" is used in various meanings of one of the areas of the disk K divided in the radial direction, a path of the head HD at a particular radial position, data extending in the circumferential direction of the disk DK, data for one circumference written to a track at a particular radial position, data written to a track, part of data written to a track, and the like. The term "sector" is used in various meanings of one of the areas of a track divided in its circumferential direction, data written to a particular position on the disk DK, data written to a sector, and the like. The "width of a track in the radial direction" may be referred to as "track width". The "width of a write track in the radial direction" may be referred to as "write track width" and the "width of a read track in the radial direction" may be referred to as "read track width". The "write track width" may be referred to simply as "track width", the "read track width" may be referred to simply as "track width" and the "write track width" and "read track width" may collectively be referred to simply as "track width". The "path passing through the central position of the track width of a particular track" will be referred to as "track center". The "path passing through the central position of the write track width of a particular write track" may be referred to as "write track center" and the "path passing through the central position of the read track width of a read track" may be referred to as "read track center". The "write track center" may be referred to simply as "track center", the "read track center" may be referred to simply as "track center" and the "write track center" and "read track center" may collectively be referred to simply as "track center". In addition, target radial positions to write tracks may be referred to as target positions. The target positions may be, for example, arranged in a circle coaxial with the disk DK in the tracks of the disk DK. For example, each target position corresponds to a track center.

The disk DK usually includes at least one of an area where data is written in a conventional magnetic recording (CMR) mode (which may be referred to as a conventional recording area hereinafter) in which a track adjacent to a particular track (which may be referred to as an adjacent track hereinafter) is written with a particular interval therebetween in the radial direction and an area where data is written in a shingled write magnetic recording (SMR) or a shingled write recording (SWR) mode (which may be referred to as a shingled write recording area hereinafter) in which a track to be written next is written over part of a particular track in the radial direction. In the first embodiment, the conventional recording area and shingled write recording area are set (or placed) in the disk DK. The term "adjacent" may be used to mean not only that data, objects, area, spaces, etc., are arranged in contact with each other but also that they are arranged (or spaced) at particular intervals. The track per inch (TPI) of the shingled write recording area is higher than that of a not-overwritten recording area, such as the conventional recording area. The shingled write recording area includes at least one group of tracks (which may be referred to as a band or a band area hereinafter) which are continuously overwritten in one direction in the radial direction. Two band areas which are adjacent in the radial direction are arranged with space (a gap) therebetween. Hereinafter, "writing data in the CMR mode" may be referred to simply as "conventional recording" or "conventional recording process" and "writing data in the SWR mode" may be referred to simply as "shingled recording" or "shingled recording process".

The head HD is opposed to the disk DK. For example, one head HD is opposed to one recording surface of the disk DK. In other words, a plurality of heads HD are opposed to a plurality of recording surfaces, respectively. The head HD includes a write head WHD and a read head RHD mounted on a slider serving as a main body. The write head WHD writes data to the disk DK. The read head RHD reads data from the disk DK. The "write head WHD" may be referred to simply as "head HD", the "read head RHD" may be referred to simply as "head HD" and the "write head WHD" and "read head RHD" may collectively be referred to as "head HD". The "central part of the head HD" may be referred to as "head HD", the "central part of the write head WHD" may be referred to as "write head WHD" and "the central part of the read head RHD" may be referred to as "read head RHD". The "central part of the write head WHD" may be referred to simply as "head HD" and the "central part of the read head RHD" may be referred to simply as "head HD". "Positioning the central part of the head HD in the center of a particular track" may be expressed as "positioning the head HD in a particular track", "placing the head HD in a particular track", "locating the head HD in a particular track" or the like.

FIG. 2 is a schematic view showing an example of placement of the head HD with respect to the disk DK according to the first embodiment. The direction in which the disk DK rotates in the circumferential direction as shown in FIG. 2 will be referred to as a rotational direction. Though the rotational direction is a counterclockwise direction in the example shown in FIG. 2, it may be an opposite (clockwise) direction.

In FIG. 2, the user data area UA of the disk DK includes a conventional recording area CZ and a shingled recording area SMA. In the magnetic disk device 1 of the shingled recording type, data is allowed to be written randomly in the user data area UA of the conventional recording area CZ, that is, conventional recording is allowed. Hereinafter, the conventional recording area CZ of the user data area in which data is allowed to be written randomly, or conventional recording is allowed in the magnetic disk device 1 of the shingled recording type, may be referred to as a conventional zone CZ. The conventional zone CZ is defined in the zone-device ATA command (ZAC) and the zone block command (ZBC), which are command standards for the magnetic disk device 1 of the shingled recording type. In the conventional zone CZ, data to be frequently rewritten, such as system files and metadata, can be recorded. In the example shown in FIG. 2, the shingled recording area SMA is placed on the innermost circumference in the radial direction. The conventional zone CZ is adjacent to the shingled recording area SMA in its outward direction.

In the example shown in FIG. 2, the disk DK includes disks DK1, DK2, . . . , and DKN. The disks DK1 to DKN are put one on another coaxially and spaced in one direction. The disks DK1 to DKN have the same diameter. The terms such as "same", "identical", "coincident" and "equal" not only have the same meaning, but also vary in meaning to such a degree that they are considered substantially the same. The disks DK1 to KN may have different diameters. The disk DK1 has a front surface S0 and a back surface S1 opposed to the front surface S0. The front surface S0 includes a user data area UA0. The user data area UA0 includes a shingled recording area SMA0 and a conventional zone CZ0 that is adjacent to the shingled recording area SMA0 in the outward direction. The back surface S1 includes a user data area UA1. The user data area UA1 includes a shingled recording area SMA1 and a conventional zone CZ1 that is adjacent to the shingled recording area SMA1 in the outward direction.

The disk DK2 has a front surface S2 and a back surface S3 opposed to the front surface S2. The front surface S2 is opposed to the back surface S1. The front surface S2 includes a user data area UA2. The user data area UA2 includes a shingled recording area SMA2 and a conventional zone CZ2 that is adjacent to the shingled recording area SMA2 in the outward direction. The back surface S3 has a user data area UA3. The user data area UA3 includes a shingled recording area SMA3 and a conventional zone CZ3 that is adjacent to the shingled recording area SMA3 in the outward direction.

The disk DKN has a front surface S(N−1) and a back surface SN opposed to the front surface S(N−1). The surface S(N−1) includes a user data area UA(N−1). The user data area UA(N−1) includes a shingled recording area SMA(N−1) and a conventional zone CZ(N−1) that is adjacent to the shingled recording area SMA(N−1) in the outward direction. The back surface SN includes a user data area UAN. The user data area UAN includes a shingled recording area SMAN and a conventional zone CZN that is adjacent to the shingled recording area SMAN in the outward direction.

In FIG. 2, the head HD includes heads HD0, HD1, HD2, HD3, . . . , HD(N−1) and HDN. The head HD0 is opposed to the front surface S0. The head HD0 writes data to the front surface S0 and reads data from the front surface S0. The head HD1 is opposed to the back surface S1. The head HD1 writes data to the back surface S1 and reads data from the back surface S. The head HD2 is opposed to the front surface S2. The head HD2 writes data to the front surface S2 and reads data from the front surface S2. The head HD3 is opposed to the back surface S3. The head HD3 writes data to the back surface S3 and reads data from the back surface S3. The head HD(N−1) is opposed to the front surface S(N−1). The head HD(N−1) writes data to the front surface S(N−1) and reads data from the back surface S(N−1). The head HDN is opposed to the back surface SN. The head HDN writes data to the back surface SN and reads data from the back surface SN.

In FIG. 2, the total recording capacity of data that can be written to the recording surface of the disk DK by the head HD (which may be referred to simply as the total capacity hereinafter) is the total of the recording capacity of data that can be written to the front surface S0 of the disk DK1 by the head HD0, the recording capacity of data that can be written to the back surface S1 of the disk DK1 by the head HD, the recording capacity of data that can be written to the front surface S2 of the disk DK2 by the head HD2, the recording capacity of data that can be written to the back surface S3 of the disk DK2 by the head HD3, . . . , the recording capacity of data that can be written to the front surface S(N−1) of the disk DKN by the head HD(N−1), and the recording capacity of data that can be written to the back surface SN of the disk DKN by the head HDN. Note that the total capacity may be, for example, the total of the recording capacities of data that can be written to all of the disks DK1 to DKN mounted on the magnetic disk device 1, the total of the recording capacities of data that can be written to the recording surfaces of some of the disks DK1 to DKN, or the recording capacity of data that can be written to the recording surface of one of the disks DK1 to DKN. Hereinafter, the "recording capacity of a particular recording surface of a particular disk DK to which data can be written by the head HD corresponding to the recording surface" may be referred to simply as "recording capacity".

In FIG. 2, the total recording capacity of data that can be written to the user data area UA (the recording capacity of the user data area UA) by the head HD (which may be referred to as the total user data capacity) is the total of the recording capacity of data that can be written to the user data area UAL of the front surface S0 by the head HD0 (the recording capacity of the user data area UA0), the recording capacity of data that can be written to the user data area UA1 of the back surface S1 by the head HD1 (the recording capacity of the user data area UA1), the recording capacity of data that can be written to the user data area UA2 of the front surface S2 by the head HD2 (the recording capacity of the user data area UA2), the recording capacity of data that can be written to the user data area UA3 of the back surface S3 by the head HD3 (the recording capacity of the user data area UA3), . . . , the recording capacity of data that can be written to the user data area UA(N−1) of the front surface S(N−1) by the head HD(N−1) (the recording capacity of the user data area UA(N−1), and the recording capacity of data that can be written to the user data area UAN of the back surface SN by the head HDN (the recording capacity of the user data area UAN). Note that the total user data capacity may be the total of the recording capacities of data that can be written to the user data areas UA on the recording surfaces of all of the disks DK1 to DKN mounted on the magnetic disk device 1, the total of the recording capacities of data that can be written to the user data areas UA on the recording surfaces of some of the disks DK1 to DKN, or the recording capacity of data that can be written to the user data area UA on the recording surface of one of the disks DK1 to DKN.

In FIG. 2, the total recording capacity of data that can be written to the shingled recording area SMA by the head HD (the total recording capacity of the shingled recording area SMA) (which may be referred to as the total shingled recording capacity) is the total of the recording capacity of data that can be written to the shingled recording area SHA on the front surface S0 by the head HD0 (the recording capacity of the shingled recording area SMA0), the recording capacity of data that can be written to the shingled recording area SMA on the back surface S1 by the head HD1

(the recording capacity of the shingled recording area SMA1), the recording capacity of data that can be written to the shingled recording area SMA2 on the front surface S2 by the head HD2 (the recording capacity of the shingled recording area SMA2), the recording capacity of data that can be written to the shingled recording area SMA3 on the back surface S3 by the head HD3 (the recording capacity of the shingled recording area SMA3), . . . , the recording capacity of data that can be written to the shingled recording area SMA(N−1) on the front surface S(N−1) by the head HD(N−1) (the recording capacity of the shingled recording area SMA(N−1)), and the recording capacity of data that can be written to the shingled recording area SMAN on the front surface SN by the head HDN (the recording capacity of the shingled recording area SMAN). Note that the total shingled recording capacity may be the total of the recording capacities of data that can be written to the shingled recording areas on the recording surfaces of all of the disks DK1 to DKN mounted on the magnetic disk device 1, the total of the recording capacities of data that can be written to the shingled recording areas SMA on the recording surfaces of some of the disks DK1 to DKN, or the recording capacity of data that can be written to the shingled recording area SMA on the recording surface of one of the disks DK1 to DKN.

In FIG. 2, the recording capacity conventional zone total (recording capacity of conventional zone CZ) of data that can be written to the conventional zone CZ by the head HD (which may be referred to as the total conventional zone capacity hereinafter) is the total of the recording capacity of data that can be written to the conventional zone CZ0 on the front surface S0 by the head HD0 (the recording capacity of conventional zone CZ0), the recording capacity of data that can be written to the conventional zone CZ1 on the back surface S1 by the head HD1 (the recording capacity of conventional zone CZ1), the recording capacity of data that can be written to the conventional zone CZ2 on the front surface S2 by the head HD2 (the recording capacity of conventional zone CZ2), the recording capacity of data that can be written to the conventional zone CZ3 on the back surface S3 by the head HD3 (the recording capacity of conventional zone CZ3), . . . , the recording capacity of data that can be written to the conventional zone CZ(N−1) on the front surface S(N−1) by the head HD(N−1) (the recording capacity of conventional zone CZ(N−1)), and the recording capacity of data that can be written to the conventional zone CZN on the back surface SN by the head HDN (the recording capacity of conventional zone CZN). Note that the total conventional zone capacity may be the total of the recording capacities of data that can be written to the conventional zone CZ on the recording surfaces of all of the disks DK1 to DKN mounted on the magnetic disk device 1, the total of the recording capacities of data that can be written to the conventional zone CZ on the recording surfaces of some of the disks DK1 to DKN, or the recording capacity of data that can be written to the conventional zone CZ on the recording surface of one of the disks DK1 to DKN.

The driver IC 20 controls the driving of the SPM 12 and the VCM 14 under the control of the system controller 130 (corresponding to an MPU 60 which will be described in detail later).

The head amplifier IC (preamplifier) 30 includes a read amplifier, a write driver and the like. The read amplifier amplifies a read signal read from the disk DK and outputs the amplified read signal to the system controller 130 (corresponding to a read/write (R/W) channel 50 which will be described in detail later). The write driver outputs a write current to the head HD in response to a signal output from the R/W channel 50.

The volatile memory 70 is a semiconductor memory in which stored data is lost when power supply is interrupted. The volatile memory 70 stores, for example, data necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory in which stored data can be recorded even though power supply is interrupted. The nonvolatile memory 80 is, for example, a NOR or NAND flash read only memory (FROM).

The buffer memory 90 is a semiconductor memory in which, for example, data transmitted and received between the magnetic disk device 1 and the host 100 is temporarily recorded. Note that the buffer memory 90 may be formed integrally with the volatile memory 70 as one unit. The buffer memory 90 is, for example, a DRAM, a static random access memory (SRAM), an SDRAM, a ferroelectric random access memory (FeRAM), or a magnetoresistive random access memory (MRAM).

The system controller (controller) 130 is implemented using, for example, a large-scale integrated circuit (LSI) called a system-on-a-chip (SoC) in which a plurality of devices are integrated on a single chip. The system controller 130 includes a hard disk controller (HDC) 40, a read/write (R/W) channel 50, and a microprocessor or microprocessing unit (MPU) 60. The HDC 40, R/W channel 50 and MPU 60 are electrically connected to each other. The system controller 130 is electrically connected to the driver IC 20, head amplifier IC 30, volatile memory 70, nonvolatile memory 80, buffer memory 90, host system 100 and the like.

The HDC 40 controls data transfer between the host 100 and the R/W channel 50 in response to an instruction from the MPU 60 to be described later. The HDC 40 is electrically connected to the volatile memory 70, nonvolatile memory 80, buffer memory 90 and the like.

The R/W channel 50 executes signal processing for read data and write data in response to an instruction from the MPU 60. The R/W channel 50 has a circuit or function for modulating write data. The R/W channel 50 also has a circuit or function for measuring the signal quality of read data. The R/W channel 50 is electrically connected to the head amplifier IC 30 and the like.

The MPU 60 is a main controller that controls each unit of the magnetic disk device 1. The MPU 60 controls the VCM 14 through the driver IC 20 to position the head HD. The MPU 60 controls an operation of writing data to the disk DK and selects a destination to store write data transferred from the host 100. The MPU 60 also controls an operation of reading data from the disk DK and controls processing of read data transferred from the disk DK to the host 100. The MPU 60 manages an area in which data is recorded. The MPU 60 is connected to each unit of the magnetic disk device 1. The MPU 60 is electrically connected to the driver TC 20, HDC 40, R/W channel 50, and the like.

The MPU 60 includes a read/write control unit 610, a head/logical block address (LBA) management unit 620, and a recording area management unit 630. The MPU 60 executes processing of each unit, such as the read/write control unit 610, head/LBA management unit 620 and recording area management unit 630, on firmware. Note that the MPU 60 may include as a circuit each unit, such as the read/write control unit 610, head/LBA management unit 620 and recording area management unit 630.

The read/write control unit 610 controls data read processing and data write processing in response to a command or the like from a host 100. The read/write control unit 610 controls the VCM 14 via the driver IC 20 and places the head HD at a particular radial position on the disk DK to execute read processing or write processing. Hereinafter, the "write processing" and "read processing" may be expressed by the term "access" or "access processing".

The read/write control unit 60 performs normal recording in response to a command or the like from the host 100. The read/write control unit 610 normally records data such as a system file and metadata in the conventional zone CZ of the user data area UA of the disk DK in response to a command or the like from the host 100. The read/write control unit 610 normally records data randomly and sequentially in, for example, the conventional zone CZ. The read/write control unit 610 performs shingled recording for a plurality of tracks at particular track pitches (which may be referred to as normal recording track pitches hereinafter) in, for example, the conventional zone CZ of the user data area UA.

The read/write control unit 610 performs shingled recording in response to a command or the like from the host 100. The read/write control unit 610 shingled-records data in the shingled recording area SMA of the user data area UA of the disk DK in response to a command or the like from the host 100. The read/write control unit 610 shingled-records data in, for example, the shingled recording area SMA sequentially for each band area. The read/write control unit 610 performs shingled recording for a plurality of tracks at particular track pitches (which may be referred to as shingled recording track pitches hereinafter) in, for example, the shingled recording area SMA of the user data area UA. The shingled recording track pitch WTP is smaller than, for example, the normal recording track pitch CTP.

Figure 3:
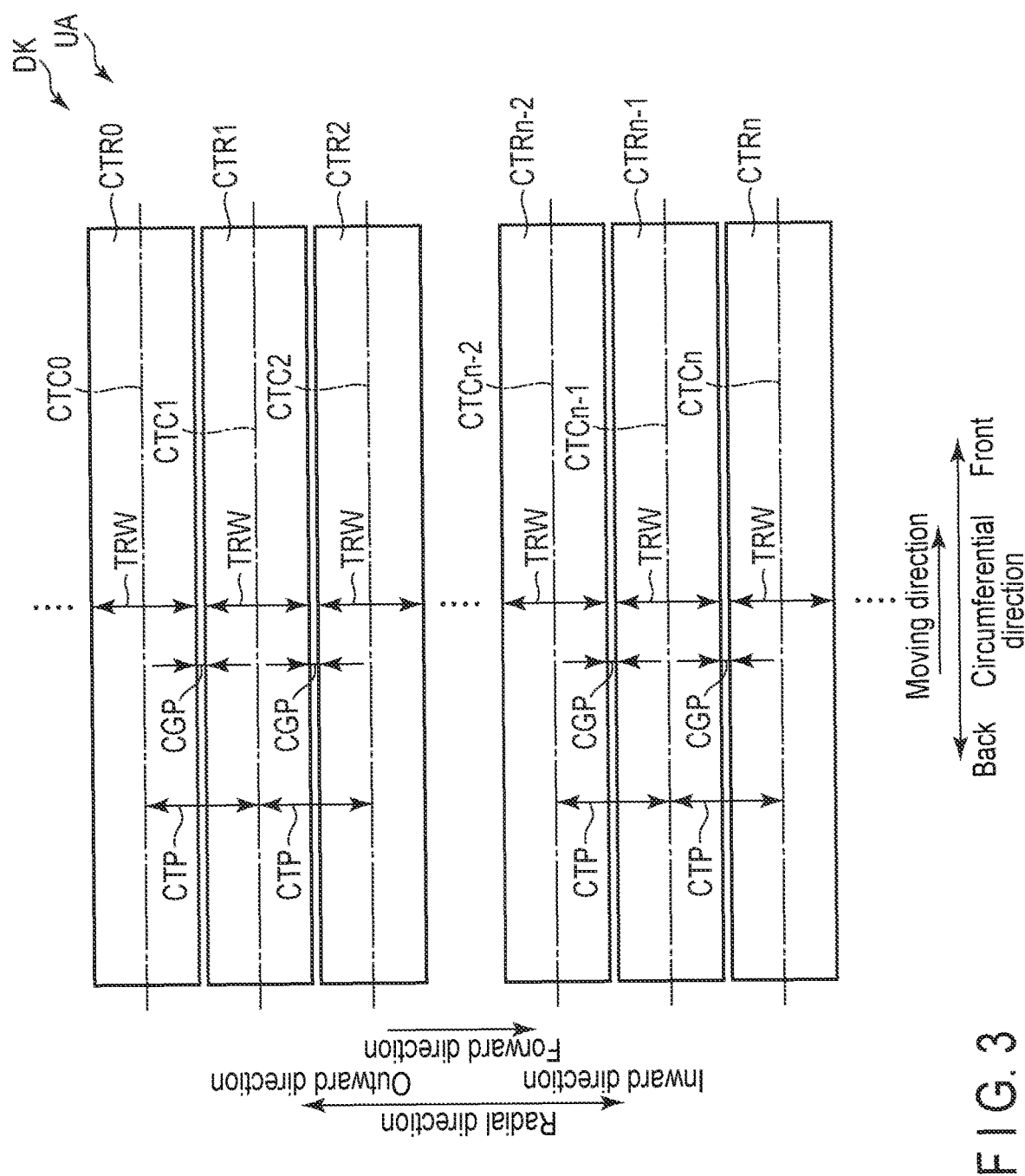
FIG. 3 is a schematic diagram snowing an example of a normal recording process.

FIG. 3 is a schematic diagram showing an example of a normal recording process. As shown in FIG. 3, a direction in which data is written and read sequentially in the radial direction will be referred to as a forward direction. In FIG. 3, the forward direction is an inward direction. The forward direction may be an outward direction. As shown in FIG. 3, a direction in which the head HD moves relative to the disk DK in the circumferential direction, namely, a direction in which data is read/written, may be referred to as a moving direction. In the example shown in FIG. 3, the moving direction is an anterior direction. The moving direction may be a posterior direction. FIG. 3 shows tracks CTR0, CTR1, CTR2, . . . , CTRn-2, CTRn-1 and CTRn. In FIG. 3, the tracks CTR0 to CTRn are arranged in the order described from the outward direction to the inward direction.

FIG. 3 shows track center CTC0 of the track CTR0 with track width TRW, track center CTC1 of the track CTR1 with track width TRW, track center CTC2 of the track CTR2 with track width TRW, . . . , track center CTCn-2 of the track CTRn-2 with track width TRW, track center CTCn-1 of the track CTRn-1 with track width TRW, and track center CTCn of the track CTRn with track width TRW. Note that the track widths of the tracks CTR0 to CTRn may be different from one another.

In the example shown in FIG. 3, the tracks CTR0 to CTRn are arranged at normal recording track pitches CTP in the radial direction. For example, the track center CTC of the track CTR0 and the track center CTC1 of the track CTR1 are spaced at normal recording track pitch CTP in the radial direction, and the track center CTC1 of the track CTR and the track center CTC2 of the track CTR2 are spaced at normal recording track pitch CTP in the radial direction. In addition, the track center CTCn-2 of the track CTRn-2 and the track center CTCn-1 of the track CTRn-1 are spaced at normal recording track pitch CTP in the radial direction, and the track center CTCn-1 of the track CTRn-1 and the track center CTCn of the track CTRn are spaced at normal recording track pitch CTP in the radial direction. Note that the tracks CTR0 to CTRn may be arranged at different track pitches (normal recording track pitches) in the radial direction.

In the example shown in FIG. 3, the tracks CTR0 to CTRn are arranged (or spaced) with gap CGP in the radial direction. For example, the tracks CTR0 and CTR1 are spaced with gap CGP in the radial direction, and the tracks CTR and CTR2 are spaced with gap CGP in the radial direction. The tracks CTRn-2 and CTRn-1 are spaced with gap CGP in the radial direction, and the tracks CTRn-1 and CTRn are spaced with gap CGP in the radial direction. Note that the tracks CTR0 to CTRn may be arranged (spaced) with different gaps.

In FIG. 3, for convenience of description, each track is shaped like a rectangle extending in the circumferential direction with a particular track width, but in actuality, it is curved along the circumferential direction. Each track may also be shaped like a wave extending in the circumferential direction while varying in the radial direction.

In the example shown in FIG. 3, the read/write control unit 610 positions the head HD at the track center CTC0 in the normal recording area of the user data area UA to perform normal recording for the track CTR0. In the normal recording area of the user data area UA, the read/write control unit 610 positions the head HD at the track center CTC1 that is spaced inward from the track center CTC0 of the track CTR0 at normal recording track pitch CTP to perform normal recording for the track CTR1. In the normal recording area of the user data area UA, the read/write control unit 610 positions the head HD at the track center CTC2 that is separated inward from the track center CTC1 of the track CTR1 at normal recording track pitch CTP to perform normal recording for the track CTR2.

In the example shown in FIG. 3, in the normal recording area of the user data area UA, the read/write control unit 610 positions the head HD at the track center CTCn-1 that is spaced inward from the track center CTCn-2 of the track CTRn-2 at normal recording track pitch CTP to perform normal recording for the track CTRn-1. In the normal recording area of the user data area UA, the read/write control unit 610 positions the head HD at the track center CTCn that is spaced inward from the track center CTCn-1 of the track CTRn-1 at normal recording track pitch CTP to perform normal recording for the track CTRn.

In the example shown in FIG. 3, the read/write control unit 610 may perform normal recording for the tracks CTR0, CTR1, CTR2, . . . , CTRn-2, CTRn-1 and CTRn sequentially in the normal recording area of the user data area UA or may perform normal recording randomly for a particular sector of each of the tracks CTR0, CTR1, CTR2, . . . , CTRn-2, CTRn-1 and CTRRn.

Figure 4:
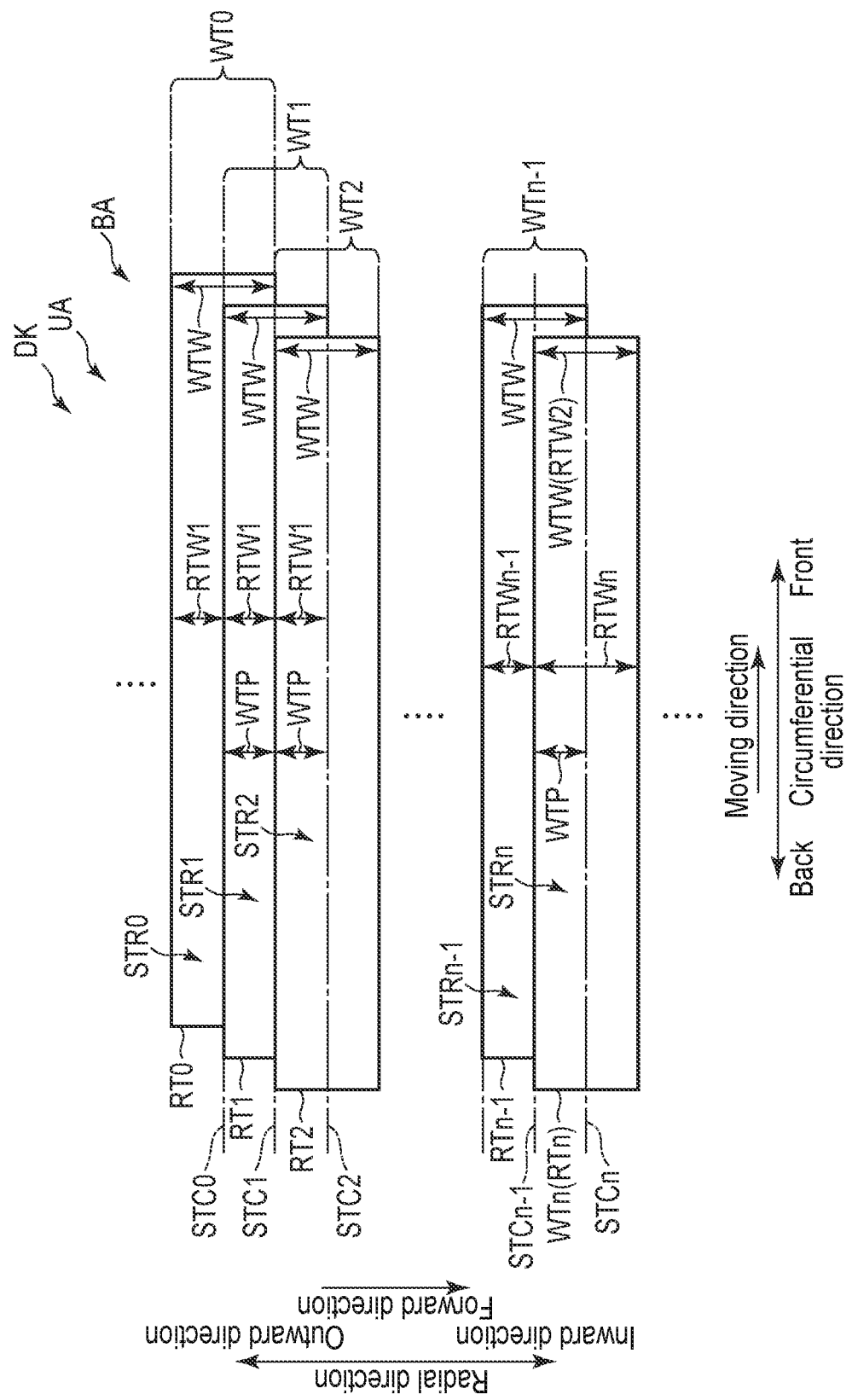
FIG. 4 is a schematic diagram showing an example of an SMR or SWR process.

FIG. 4 is a schematic diagram showing an example of a shingled recording process. FIG. 4 shows a particular band area BA of the user data area UA. In the example shown in FIG. 4, the band area BA includes tracks STR0, STR1, STR2, . . . , STRn-1 and STRn. In FIG. 4, the tracks STR0 to STRn are arranged in the order described from the outward direction to the inward direction. In FIG. 4, the tracks STR0 to STRn are overlaid in the forward direction.

In FIG. 4, of the tracks STR0 to STRn, the track STR0 written to the disk DK by the write head WHD may be referred to as a write track WT0, the track STR1 written to the disk DK by the write head WHD may be referred to as a write track WT1, the track STR2 written to the disk DK by the write head WHO may be referred to as a write track WT2, the track STRn-1 written to the disk DK by the write head WHD may be referred to as a write track WTn-1, and the track STRn written to the disk DK by the write head WHD may be referred to as a write track WTn.

FIG. 4 shows track center STC0 of the write track WT0 (track STR0) with write track width WTW, track center STC1 of the write track WT1 (track STR1) with write track width WTW, track center STC2 of the write track WT2 (track STR2) with write track width WTW, . . . , track center STCn-1 of the write track WTn-1 (track STRn-1) with write track width WTW, and track center STCn of the write track WTn (track STRn) with write track width WTW. Note that the write track widths of the write tracks WT0 to WTn may be different from one another.

In the example shown in FIG. 4, the write tracks WT0 (track STR0) to WTn (STRn) are arranged at shingled recording track pitches WTP in the radial direction. For example, the track center STC0 of the write track WT0 and the track center STC1 of the write track WT1 are spaced at shingled recording track pitch WTP in the radial direction. For example, the track center STC1 of the write track WT1 and the track center STC2 of the write track WT2 are spaced at shingled recording track pitch WTP in the radial direction. For example, the track center STCn-1 of the write track WTn-1 and the track center STCn of the write track WTn are spaced at shingled recording track pitch WTP in the radial direction. Note that the write tracks WT0 (track STR0) to WTn (track STRn) may be arranged at different track pitches (shingled recording track pitches) in the radial direction.

In addition, the write tracks WT0 (track STR0) to WTn (track STRn) are overlaid in the forward direction. The area of the write track WT0 other than the area overlaid with the write track WT1 is referred to as a read track RT0 (track STR0), the area of the write track WT1 other than the area overlaid with the write tracks WT2 is referred to as read track RT1 (track STR1), and the area of the write track WTn-1 other than the area overlaid with the write tracks WTn is referred to as read track RTn-1 (track STRn-1). In addition, a write track (Hereinafter referred to as the last track in some cases) WTn that is written last and not overlaid with other write tracks when they are written sequentially in the forward direction in the band area BA, may be referred to as a read track WTn (final track). FIG. 4 shows the read track width RTW1 of each of the read tracks RT0 to RTn-1. In FIG. 4, the read track width RTW2 of the read track RTn is the same as the write track width WTW of the write track WTn. The read track width RTW1 is smaller than the write track width WTW. The read track widths of the read tracks RT0 to RTn-1 may be different from one another.

In FIG. 4, for convenience of description, each track is shaped like a rectangle extending in the circumferential direction with a particular track width, but in actuality, it is curved along the circumferential direction. Each track may also be shaped like a wave extending in the circumferential direction while varying in the radial direction.

In the example shown in FIG. 4, in a particular band area BA of the user data area UA, the read/write control unit 610 performs shingled recording for the write tracks WT0, WT1, WT2, . . . , WTWn-1 and WTWn sequentially in the forward direction in the order described. In other words, in a particular band area BA of the user data area UA, the read/write control unit 610 overwrites the tracks STR0 (write track % T0), STR1 (write track WT1), STR2 (write track WT2), . . . , STRn-1 (write track WTn-1) and STRn (write track WTn) in the forward direction in the order described.

In the example shown in FIG. 4, in a particular band area BA of the user data area UA, the read/write control unit 610 positions the head HD at the track center STC1 that is spaced from the track center STC0 of the write track WT0 (track STR0) at track pitch WTP in the forward direction to shingled-record the write track WT1 in the write track WT0. In a particular band area BA of a user data area UA, the read/write control unit 610 positions the head HD at the track center STC2 that is spaced from the track center STC1 of the write track WT1 at track pitch WTP in the forward direction to shingled-record the write track WT2 in the write track WT1. In a particular band area BA of the user data area UA, the read/write control unit 610 positions the head HD at the track center STCn that is spaced from the track center STCn-1 of the write track WTn-1 at track pitch WTP in the forward direction to shingled-record the write track (final track) WTn in the write track WTn-1.

The head/LBA management unit 620 manages the head HD and the LBA. The head/LBA management unit 620 transmits information of the head HD to the host 100 to inhibit the use of a head HD that is deteriorated or troubled or the like (which may be referred to as a defective head hereinafter) in response to a command or the like from the host 100. Accordingly, the head/LBA management unit 620 inhibits the use of the recording surface (which may be referred to as an invalid recording surface hereinafter) of the disk DK corresponding to the defective head HD the use of which is inhibited. Hereinafter, "inhibiting the use of the head HD" may be referred to as "deleting the head HD". In addition, "inhibiting the use of the recording surface (invalid recording surface) of the disk DK" may be referred to as "deleting the recording surface (invalid recording surface) of the disk DK". When the head/LBA management unit 620 inhibits the use of the recording surface (invalid recording surface) of a particular disk DK, it uses a head HD corresponding to a recording surface other than the invalid recording surface of the particular disk DK to change a correspondence between a physical address (head or cylinder number, head number, sector number, etc.) of each sector of the user data area UA of the recording surface (which may be referred to as a valid recording surface) of the disk DK capable of read/write processing and a logical address thereof, such as an LBA. Therefore, when the head/LBA management unit 620 inhibits the use of the recording surface (invalid recording surface) of a particular disk DK, it changes the maximum LBA in the magnetic disk device 1. As described above, the "function of inhibiting the use of a defective head HD in response to a command or the like from the host 100 and changing a correspondence between the LBA and the physical address of each sector of a valid recording surface other than the invalid recording surface corresponding to the defective head HD" may be referred to as "a logical depopulation (Logical Depop) function". The logical Depop function may be referred to simply as "Depop function" or "Depop". The Logical Depop function is defined by a particular standard.

Figure 5:
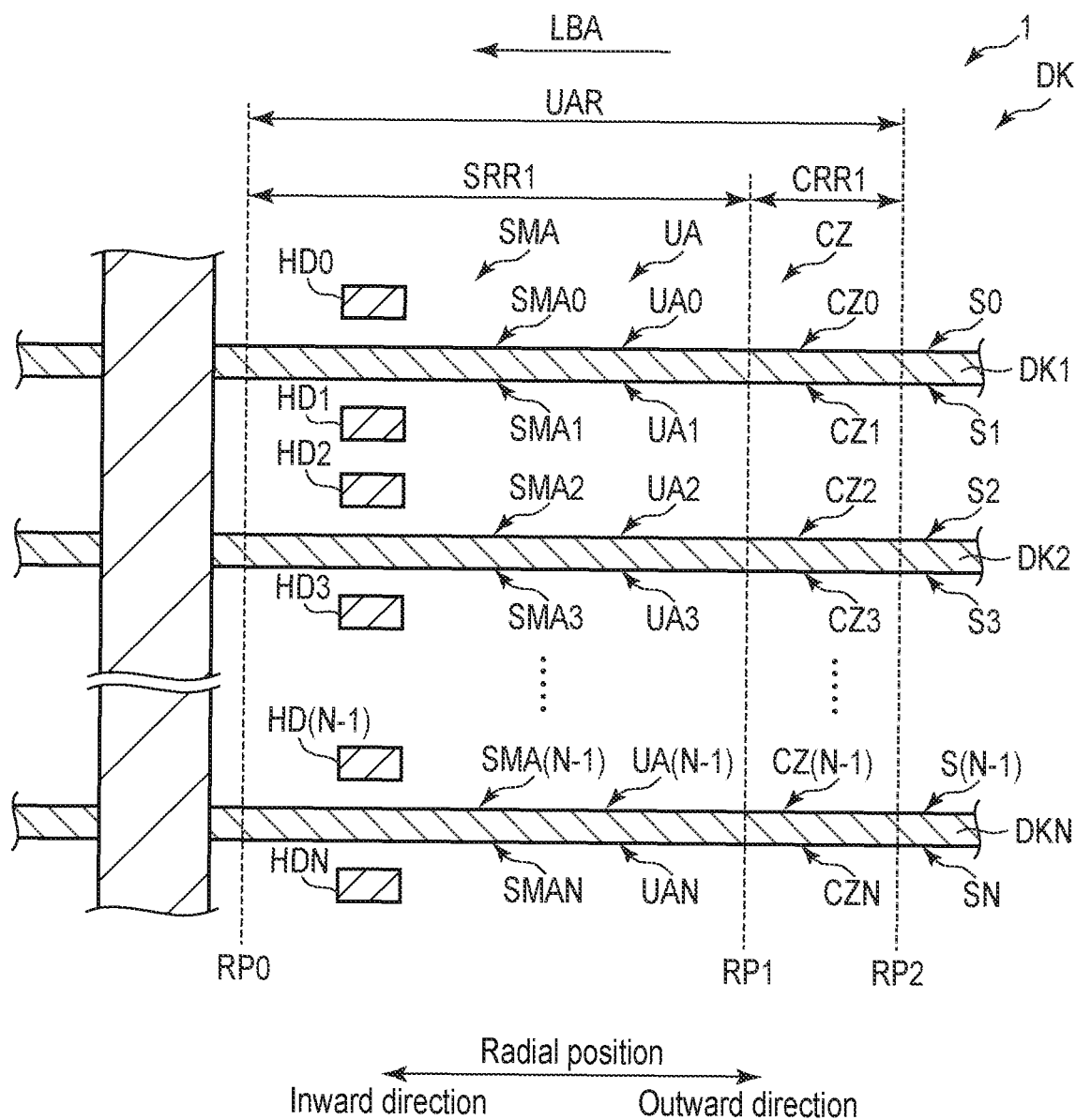
FIG. 5 is a sectional view illustrating an example of a Depop function according to the first embodiment.

FIG. 5 is a sectional view for describing an example of the Depop function according to the first embodiment. FIG. 5 corresponds to, for example, FIG. 2. In FIG. 5, for example, the LBA increases from the outside toward the inside. The LBA may increase from the inside toward the outside. FIG. 5 shows a radial position RP0, a radial position RP1 located outside the radial position RP0 and a radial position RP2 located outside the radial position RP1. In FIG. 5, the user data areas UA0 to UAN each correspond to a range in the radial direction (which may be referred to as a radial range hereinafter) UAR from the radial position RP0 (or the cylinder corresponding to the radial position RPC) to the radial position RP2 (or the cylinder corresponding to the radial position RP2). The radial ranges UAR of the user data areas UA0 to UAN may be the same, for example. The distances of the user data areas UA0 to UAN in the radial direction (which may be referred to as radial distances) is the same. Thus, the areas of the user data areas UA0 to UAN are the same. For example, the recording capacities of the user data areas UA0 to UAN are the same. Note that the radial ranges of the user data areas UA0 to UAN may be different from one another. The recording capacities of the user data areas UAQ to UAN may be different from one another. In FIG. 5, the shingled recording areas SMA0 to SMAN correspond to the radial range SRR1 from the radial position RP0 to the radial position RP1. In other words, the radial ranges SRR1 of the shingled recording areas SMA0 to SMAN are the same. The radial distances or the shingled recording areas SMA to SMAN are the same. Thus, the areas of the shingled recording areas SMA0 to SMAN are the same. For example, the recording capacities of the shingled recording areas SMA0 to SMA are the same. The radial ranges of the shingled recording areas SMA0 to SMAN may be different from one another. The recording capacities of the shingled recording areas SMA0 to SMAN may be different from one another. In FIG. 5, the conventional zones CZ0 to CZN each correspond to a radial range from the radial position RP1 to the radial position RP2. In other words, the radial ranges CRR1 of the conventional zones CZ0 to CZN are the same. The radial distances of the conventional zones CZ0 to CZN are the same. Thus, the areas of the conventional zones CZ0 to CZN are the same. For example, the recording capacities of the conventional zones CZ0 to CZN are the same. The radial ranges of the conventional zones CZ to CZN may be different from one another. The recording capacities of the conventional zones CZ0 to CZN may be different from one another. In FIG. 5, the radial range SRR1 is larger than the radial range CRR1. In FIG. 5, the radial range UAR of the user data areas UA0 to UAN corresponds to the total of the radial range SRR1 of the shingled recording areas SMA0 to SMAN and the radial range CRR1 of the conventional zones CZ0 to CZN.

In the example shown in FIG. 5, when the head/LBA management unit 620 inhibits the use of the defective head HD2 by the Depop function, it sets the invalid recording surface S2 of the disk DK2 as unavailable. When the head/LBA management unit 620 sets the invalid recording surface S2 as unavailable, it changes a correspondence between the LBA and the physical address of each sector of the user data areas UA0, UA1, and UA3 to UAN of the valid recording surfaces S0, S1, and S3 to SN other than the invalid recording surface S2. In the example of FIG. 5, the use of the head HD2 is inhibited by the Depop function. Even though the use of each of the heads HD0, HD1, and HD3 to HDN is inhibited by the Depop function, the head/LBA management unit 620 can perform the same process as in the case where the use of the head HD2 is inhibited by the Depop function.

The recording area management unit 630 manages a recording area of the disk DK (which may be referred to simply as a disk DK hereinafter). The recording area management unit 630 sets a normal recording area and a shingled recording area on the recording surface of the disk DK. When the head/LBA management unit 620 inhibits the use of a particular head HD by the Depop function, the recording area management unit 630 changes (adjusts, sets or expands) a conventional zone CZ of the recording surface of at least one disk DK. For example, when the head/LBA management unit 620 inhibits the use of a particular head HD by the Depop function, the recording area management unit 630 changes (or sets) an area other than the conventional zone on the recording surface of at least one disk DK to a conventional zone CZ.

When the head/LBA management unit 620 inhibits the use of a particular head HD by the Depop function, the recording area management unit 630 changes (or sets) part of the shingled recording area SMA to a conventional zone CZ in the user data area UA of at least one disk DK. In other words, when the head/LBA management unit 620 inhibits the use of a particular head HD by the Depop function, the recording area management unit 630 changes (or sets) part of the recording capacity of the shingled recording area SMA to the recording capacity of a conventional zone CZ in the user data area UA of at least one disk DK.

The recording area management unit 630 changes (or sets) part of the shingled recording area SMA to a conventional zone CZ in the user data area UA of at least one valid recording surface in accordance with the recording capacity (or area) of the conventional zone CZ of the invalid recording surface of a disk DK corresponding to the defective head HD the use of which is inhibited by the head/LBA management unit 620 by the Depop function. In other words, when the head/LBA management unit 620 inhibits the use of a particular defective head HD by the Depop function, the recording area management unit 630 changes (or sets) part of the shingled recording area SMA to a conventional zone CZ in the user data area UA of at least one valid recording surface in such a manner that the total conventional zone capacities before and after the use of the head HD is inhibited coincide with each other.

For example, the recording area management unit 630 changes part of the a plurality of shingled recording areas SMA corresponding to the user data areas UA of a plurality of valid recording surfaces to a plurality of conventional zones CZ corresponding to the shingled recording areas SMA in accordance with the recording capacity (or area) of the conventional zone CZ of the invalid recording surface of a disk DK corresponding to the defective head HD the use of which is inhibited by the head/LBA management unit 620 by the Depop function. Note that the recording area management unit 630 may uniformly change part of a plurality of shingled recording areas SMA corresponding to the user data areas UA of a plurality of valid recording surfaces to conventional zones CZ corresponding to the shingled recording areas SMA in accordance with the recording capacity (or area) of the conventional zone CZ of the invalid recording surface of a disk DK corresponding to the detective head HD. Furthermore, the recording area management unit 630 may nonuniformly change part of a plurality of shingled recording areas SMA corresponding to the user data areas UA of a plurality of valid recording surfaces to a plurality of conventional zones CZ corresponding to the shingled recording areas SMA in accordance with the recording capacity (or area) of the conventional zone CZ of the invalid recording surface of a disk DK corresponding to the defective head HD.

For example, the recording area management unit 630 changes part of the shingled recording areas SMA of a plurality of valid recording surfaces corresponding to the recording capacity (or area) of the conventional zone CZ of the invalid recording surface of a disk DK corresponding to the defective head HD the use of which is inhibited by the head/LBA management unit 620 by the Depop function. Note that the recording area management unit 630 may uniformly change part of the shingled recording areas SMA of a plurality of valid recording surfaces corresponding to the recording capacity (or area) of the conventional zone CZ of the invalid recording surface of a disk DK corresponding to the defective head HD the use of which is inhibited by the head/LBA management unit 620 by the Depop function. The recording area management unit 630 may nonuniformly change part of the shingled recording areas SMA of a plurality of valid recording surfaces corresponding to the recording capacity (or area) of the conventional zone CZ of the invalid recording surface of a disk DK corresponding to the defective head HD the use of which is inhibited by the head/LBA management unit 620 by the Depop function.

For example, the recording area management unit 630 changes part of the shingled recording area SMA corresponding to one of the user data areas UA of a plurality of valid recording surfaces to a conventional zone CZ corresponding to the shingled recording area SMA in accordance with the recording capacity of the conventional zone CZ of the invalid recording surface of a disk DK corresponding to the defective head HD the use of which is inhibited by the head/LBA management unit 620 by the Depop function.

The recording area management unit 630 allocates part of the recording capacity of a shingled recording area SMA to the recording capacity of a conventional zone CZ in the user data area UA of at least one valid recording surface in accordance with the recording capacity of the conventional zone CZ of the invalid recording surface of a disk DK corresponding to the defective head HD the use of which is inhibited by the head/LBA management unit 620 by the Depop function. In other words, when the head/LBA management unit 620 inhibits the use of a particular head HD by the Depop function, the recording area management unit 630 allocates part of the recording capacity of a shingled recording area SMA to the recording capacity of a conventional zone CZ in the user data area UA of at least one valid recording surface in such a manner that the total conventional zone capacities before and after the use of the head HD is inhibited coincide with each other.

For example, the recording area management unit 630 allocates the same capacity as one of the recording capacities of a plurality of shingled recording areas SMA corresponding to the user data areas UA of a plurality of valid recording surfaces to the recording capacities of conventional zones corresponding to the shingled recording areas in accordance with the recording capacity (or area) of the conventional zone CZ of the invalid recording surface of a disk DK corresponding to the defective head HD the use of which is inhibited by the head/LBA management unit 620 by the Depop function. Note that the recording area management unit 630 may uniformly allocate part of the recording capacities of a plurality of shingled recording areas SMA corresponding to the user data areas UA of a plurality of valid recording surfaces to the recording capacities of conventional zones CZ corresponding to the shingled recording areas SMA in accordance with the recording capacity (or area) of the conventional zone CZ of the invalid recording surface of a disk DK corresponding to the defective head HD. Furthermore, the recording area management unit 630 may nonuniformly allocate part of the recording capacities of a plurality of shingled recording areas SMA corresponding to the user data areas UA of a plurality of valid recording surfaces to the recording capacities of conventional zones CZ corresponding to the shingled recording areas SMA in accordance with the recording capacity (or area) of the conventional zone CZ of the invalid recording surface of a disk DK corresponding to the defective head HD.

For example, the recording area management unit 630 allocates the recording capacity of a shingled recording area SMA corresponding to one of the user data areas UA of a plurality of valid recording surfaces to the recording capacity of a conventional zone corresponding to the shingled recording area SMA in accordance with the recording capacity (or area) of the conventional zone CZ of the invalid recording surface of a disk DK corresponding to the defective head HC the use of which is inhibited by the head/LBA management unit 620 by the Depop function.

When the recording area management unit 630 changes part of the shingled recording area SMA of the user data area UA of a valid recording surface to a conventional zone CZ, the read/write control unit 610 writes data (performs normal recording) by positioning the head HD at some of the target positions where a plurality of tracks to be overlaid in shingled recording can be written so as not to overlap their adjacent tracks in the part of the shingled recording area SMA of the user data area UA which is changed to the conventional zone CZ. In other words, when the recording area management unit 630 changes part of the shingled recording area SMA of the user data area UA of a valid recording surface to a conventional zone CZ, the read/write control unit 610 performs normal recording by writing a track at a track pitch that is an integral multiple of the shingled recording track pitch in the part of the shingled recording area SMA of the user data area UA which is changed to the conventional zone CZ. Hereinafter, the "area where the recording type is changed" ay be referred to as a "changed area". The changed area corresponds to part of the shingled recording area SMA which is changed to a conventional zone CZ in accordance with the recording capacity (or area) of the conventional zone CZ of the invalid recording surface, for example.

For example, when the recording area management unit 630 changes part of the shingled recording area SMA of the user data area UA of a valid recording surface to a conventional zone CZ, the read/write control unit 610 performs normal recording by writing a plurality of tracks alternately in shingled recording in the part of the shingled recording area SMA of the user data area UA which is changed to the conventional zone CZ (changed area). In one example, when the recording area management unit 630 changes part of the shingled recording area SMA of the user data area UA of a valid recording surface to a conventional zone CZ, the read/write control unit 610 performs normal recording by writing at a track pitch that is two or more times greater than the shingled recording track pitch in the part of the shingled recording area SMA of the user data area UA which is changed to the conventional zone CZ (changed area).

Note that when the recording area management unit 630 changes part of the shingled recording area BMA of the user data area UA of a valid recording surface to a conventional zone CZ, the read/write control unit 610 may perform normal recording by writing a plurality of tracks every two or more in shingled recording in the part of the shingled recording area SMA of the user data area UA which is changed to the conventional zone CZ (changed area).

Figure 6:
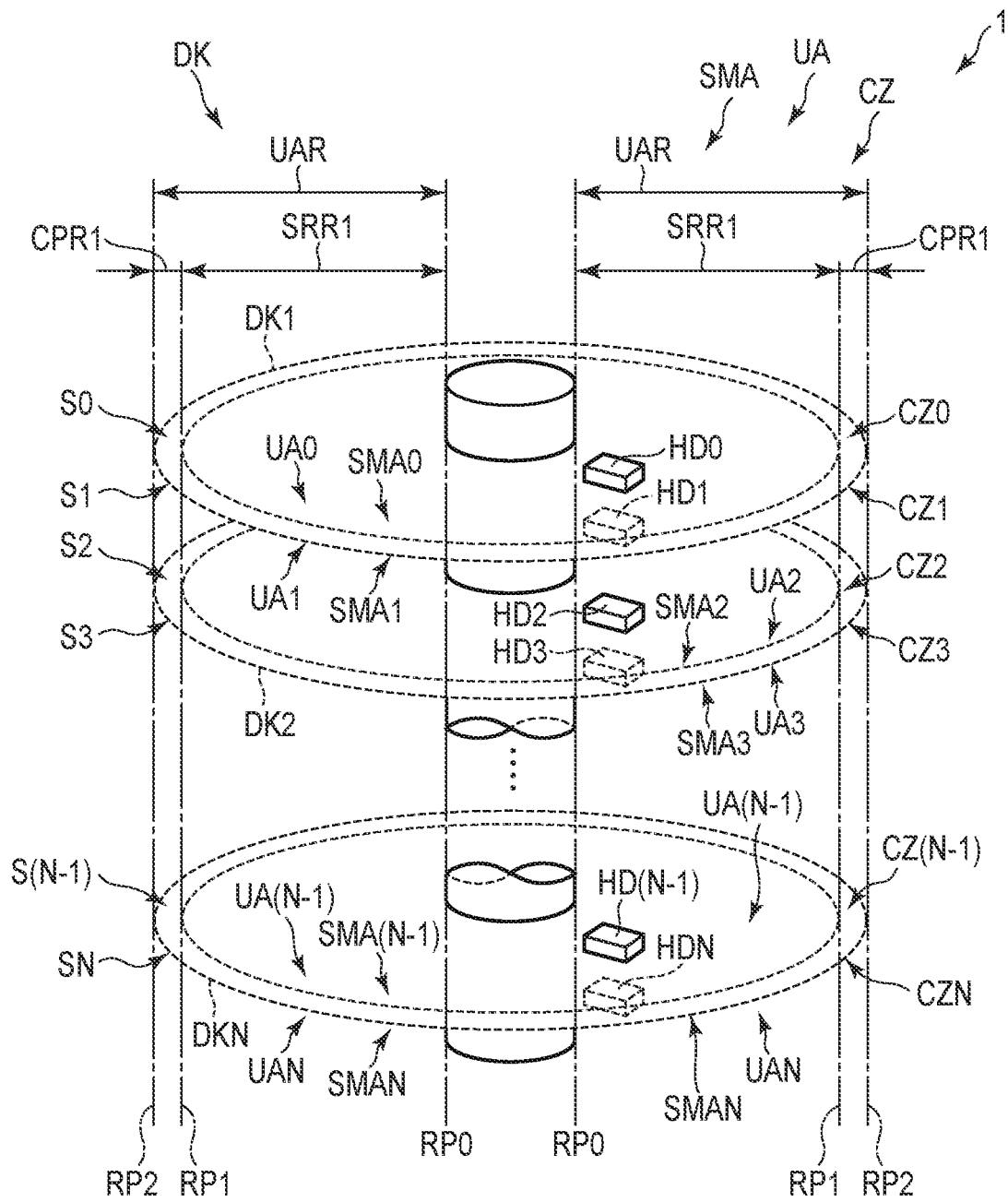
FIG. 6 is a schematic diagram showing an example of a user data area according to the first embodiment.

FIG. 6 is a schematic diagram showing an example of the user data area UA according to the first embodiment. FIG. 6 corresponds to FIGS. 2 and 5.

In the example shown in FIG. 6, the recording area management unit 630 sets a shingled recording area SMA0 with a radial range SRR1 in the user data area UA0 of the recording surface S0 of the disk DK1 and sets a conventional zone CZ0 with a radial range CRR1 therein in the outward direction of the shingled recording area SMA0. The recording area management unit 630 sets a shingled recording area SMA1 with a radial range SRR1 in the user data area UA1 of the recording surface S1 of the disk DK1 and sets a conventional zone CZ1 with a radial range CRR1 therein in the outward direction of the shingled recording area SMA1. The recording area management unit 630 sets a shingled recording area SMA2 with a radial range SRR1 in the user data area UA2 of the recording surface S2 of the disk DK2 and sets a conventional zone CZ2 with a radial range CRR1 therein in the outward direction of the shingled recording area SMA2. The recording area management unit 630 sets a shingled recording area SMA3 with a radial range SRR1 in the user data area UA3 of the recording surface S3 of the disk DK2 and sets a conventional zone CZ3 with a radial range CRR1 therein in the outward direction of the shingled recording area SMA3. The recording area management unit 630 sets a shingled recording area SMA(N−1) with a radial range SSR1 in the user data area UA(N−1) of the recording surface S(N−1) of the disk DKN and sets a conventional zone CZ(N−1) with a radial range CRR1 therein in the outward direction of the shingled recording area SMA(N−1). The recording area management unit 630 sets a shingled recording area SMAN with a radial range SRR1 in the user data area UAN of the recording surface SN of the disk DKN and sets a conventional zone CZN with a radial range CRR1 therein in the outward direction of the shingled recording area SMAN.

Figure 7:
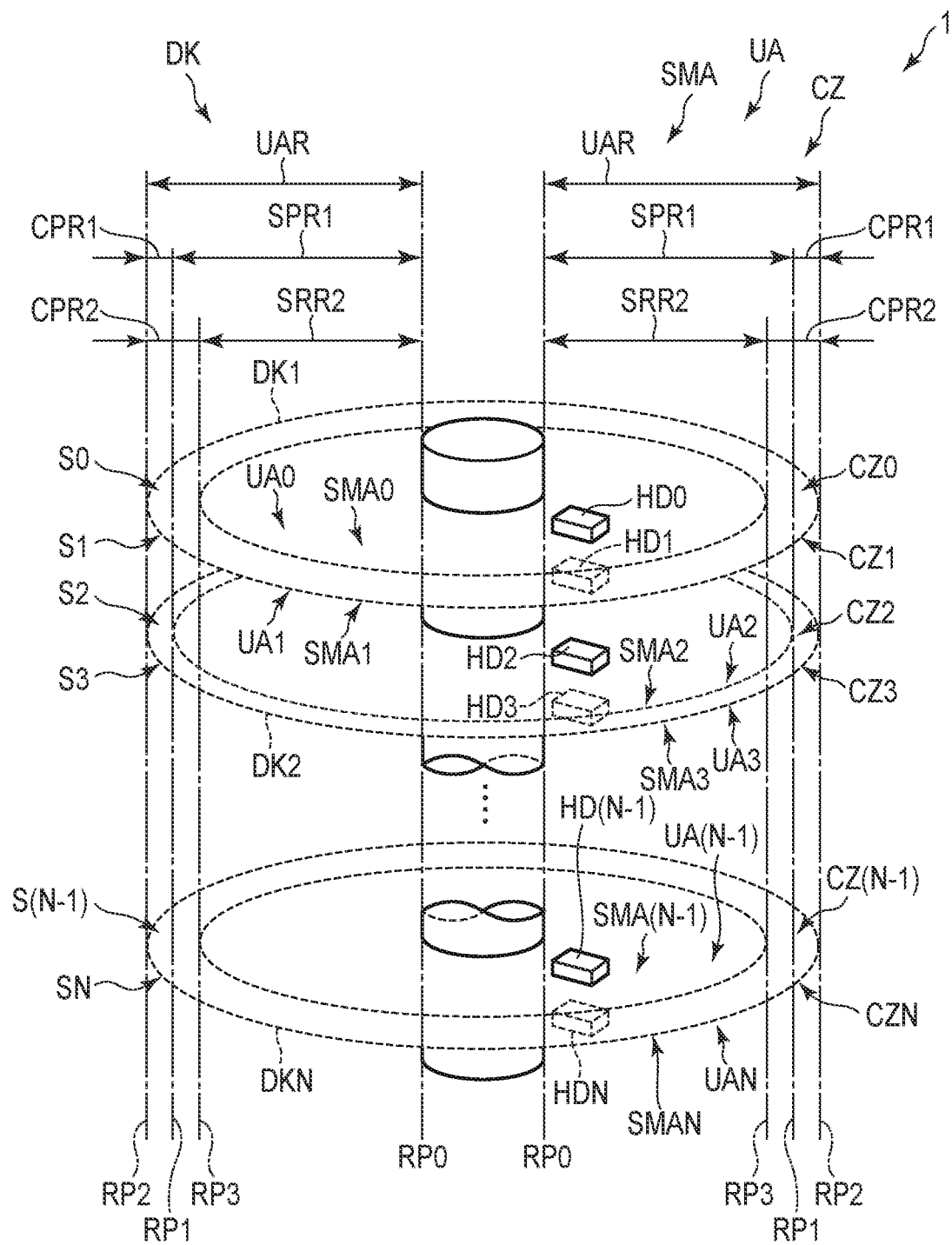
FIG. 7 is a schematic diagram showing an example of a user data area in the case where the Depop function according to the first embodiment is performed.

FIG. 7 is a schematic diagram showing an example of the user data area UA in the case where the Depop function according to the first embodiment is performed. FIG. 7 corresponds to FIGS. 5 and 6. In FIG. 7, the use of the head HD2 is inhibited by the Depop function. That is, in FIG. 7, the head HD2 performs no read/write process for the user data area UA2 of the recording surface S2. FIG. 7 shows a radial position RP3 between the radial position RP0 and the radial position RP1. In FIG. 7, the shingled recording areas SMA0, SMA1, and SMA3 to SMAN correspond to a radial range SRR2 from the radial position RP0 to the radial position RP3. In other words, the radial ranges SRR2 of the shingled recoding areas SMA0, SMA1, and SMA3 to SMAN are the same. The radial range SRR2 is smaller than the radial range SRI. That is, each of the shingled recording areas SMA0, SMA1, and SMA3 to SMAN (Area) shown in FIG. 7 (the area thereof) is smaller than its corresponding one of the shingled recording areas SMA0, SMA1, and SMA3 to SMAN (the area thereof) shown in FIG. 6. The total of areas (changed areas) corresponding to differences between the radial range SRR1 and the radial range SRR2 in the shingled recording areas SMA0, SMA1, and SMA3 to SMAN is an area corresponding to the recording capacity of the conventional zone CZ2. In other words, the areas (changed areas) corresponding to differences between the radial range SRR1 and the radial range SRR2 in the shingled recording areas SMA0, SMA1, and SMA3 to SMAN correspond to a value obtained by dividing the recording capacity of the conventional zone CZ2 by the number of valid recording surfaces S0, S1, and S3 to SN. In FIG. 7, the conventional zones CZ0, CZ1, and CZ3 to CZN correspond to a radial range CRR2 from the radial position RP3 to the radial position RP2. In other words, the radial ranges CRR2 of the conventional zones CZ0, CZ1, and CZ3 to CZN are the same. The radial range CRR2 is larger than the radial range CRR1. That is, each of the conventional zones CZ0, CZ1, and CZ3 to CZN (the area thereof) shown in FIG. 7 is larger than its corresponding one of the conventional zones CZ0, CZ1, and CZ3 to CZN (the area thereof) shown in FIG. 6. The total of areas (changed areas) corresponding to differences between the radial range CRR1 and the radial range CRR2 in the conventional zones CZ0, CZ1, and CZ3 to CZN is an area corresponding to the recording capacity of the conventional zone CZ2. In other words, the areas (changed areas) corresponding to differences between the radial range CRR1 and the radial range CRR2 in the conventional zones CZ0, CZ1, and CZ3 to CZN correspond to a value obtained by dividing the recording capacity of the conventional zone CZ2 by the number of valid recording surfaces S0, S1, and S3 to SN. In FIG. 7, the radial range SRR2 is larger than the radial range CRR2. In FIG. 7, the radial range UAR of the user data areas UA0, UA1, and UA3 to CZN corresponds to the total of the radial range SRR2 of the shingled recording areas SMA0, SMA1, and SMA3 to SMAN and the radial range CRR2 of the conventional zones CZ0, CZ1, and CZ3 to CZN.

In the example shown in FIG. 7, the recording area management unit 63C uniformly changes part of the shingled recording areas SMA0, SMA1, and SMA3 to SMAN of the valid recording surfaces S0, S1, and S3 to SN to the conventional zones CZ0, CZ1, and CZ3 to CZN of the valid recording surfaces S0, S1, and S3 to SN in accordance with the recording capacity of the conventional zone CZ2 of the invalid recording surface S2. That is, the recording area management unit 630 decreases the shingled recording areas SMA0, SMA1, and SMA3 to SMAN of the valid recording surfaces S0, S1, and S3 to SN by an area corresponding to a value obtained by dividing the recording capacity of the conventional zone CZ2 of the invalid recording surface S2 by the number of the valid recording surfaces S0, S1, and S3 to SN, and increases the conventional zones CZ0, CZ1, and CZ3 to CZN of the valid recording surfaces S0, S1, and S3 to SN by an area corresponding to a value obtained by dividing the recording capacity of the conventional zone CZ2 of the invalid recording surface S2 by the number of valid recording surfaces S0, S1, and S3 to SN. In the example shown in FIG. 7, the use of the head HD2 is inhibited by the Depop function. However, even when the use of heads other than the head HD2 is inhibited by the Depop function, the same process as in the example where the use of the head HD2 is inhibited by the Depop function can be performed.

FIG. 8 is a schematic diagram showing an example of the user data area UA in the case where the Depop function according to the first embodiment is performed. FIG. 8 corresponds to FIGS. 5 and 6. In FIG. 8, the use of the head HD2 is inhibited by the Depop function. That is, in FIG. 8, the head HD2 performs no read/write process for the user data area UA2 of the recording surface S2. FIG. 8 shows a radial position RP4 between the radial position RP0 and the radial position RP1. In FIG. 8, the shingled recording area SMA0 corresponds to a radial range SRR3 from the radial position RP0 to the radial position RP4. The radial range SRR3 is smaller than the radial range SRR1. In other words, (the area of) the shingled recording area SMA0 shown in FIG. 8 is smaller than (the area of) the shingled recording area SMA0 shown in FIG. 6. An area (changed area) corresponding to a difference between the radial ranges SRR1 and SRR3 in the shingled recording area SMA0 is an area corresponding to the recording capacity of the conventional zone CZ2. In FIG. 8, the conventional zone CZ0 corresponds to a radial range CRR3 from the radial position RP4 to the radial position RP2. The radial range CRR3 is larger than the radial range CRR1. In other words, (the area of) the conventional zone CZ0 shown in FIG. 7 is larger than (the area of) the conventional zone CZ0 shown in FIG. 6. An area (changed area) corresponding to a difference between the radial ranges CRR1 and CRR3 in the conventional zone CZ0 is an area corresponding to the recording capacity of the conventional zone CZ2. In FIG. 8, the radial range SRR3 is larger than the radial range CRR3. In FIG. 8, the radial range UAR of the user data area UA0 corresponds to the total of the radial range SRR3 of the shingled recording area SMA0 and the radial range CRR3 of the conventional zone CZ0.

In the example shown in FIG. 8, the recording area management unit 630 changes part of the shingled recording area SM0 of the valid recording surface S0 corresponding to the recording capacity of the conventional zone CZ2 of the invalid recording surface S2 to the conventional zone CZ0 of the valid recording surface S0. In other words, the recording area management unit 630 decreases the shingled recording area SMA0 of the valid recording surface S0 by an area corresponding to the recording capacity of the conventional zone CZ2 of the invalid recording surface S2, and increases the conventional zone CZ0 of the valid recording surface S0 by an area corresponding to the recording capacity of the conventional zone CZ2 of the invalid recording surface S2. In the example in FIG. 8, the use of the head HD2 is inhibited by the Depop function. However, even when the use of heads other than the head HD2 is inhibited by the Depop function, the same process as in the example where the use of the head HD2 is inhibited by the Depop function can be performed. Also, in the example shown in FIG. 8, part of the shingled recording area SMA0 of the valid recording surface S0 is changed to the conventional zone CZ0 of the valid recording surface S0 in accordance with the recording capacity of the conventional zone CZ2 of the valid recording surface S2. However, even when the shingled recording area SMA0 of a valid recording surface other than the valid recording surface S0 is changed to a conventional zone CZ corresponding to the valid recording surface other than the valid recording surface S0 in accordance with the recording capacity of the conventional zone CZ2 of the invalid recording surface S2, the same process as in the case where part of the shingled recording area SMA0 of the valid recording surface S0 is changed to the conventional zone CZ0 of the valid recording surface S0, can be performed.

Figure 9:
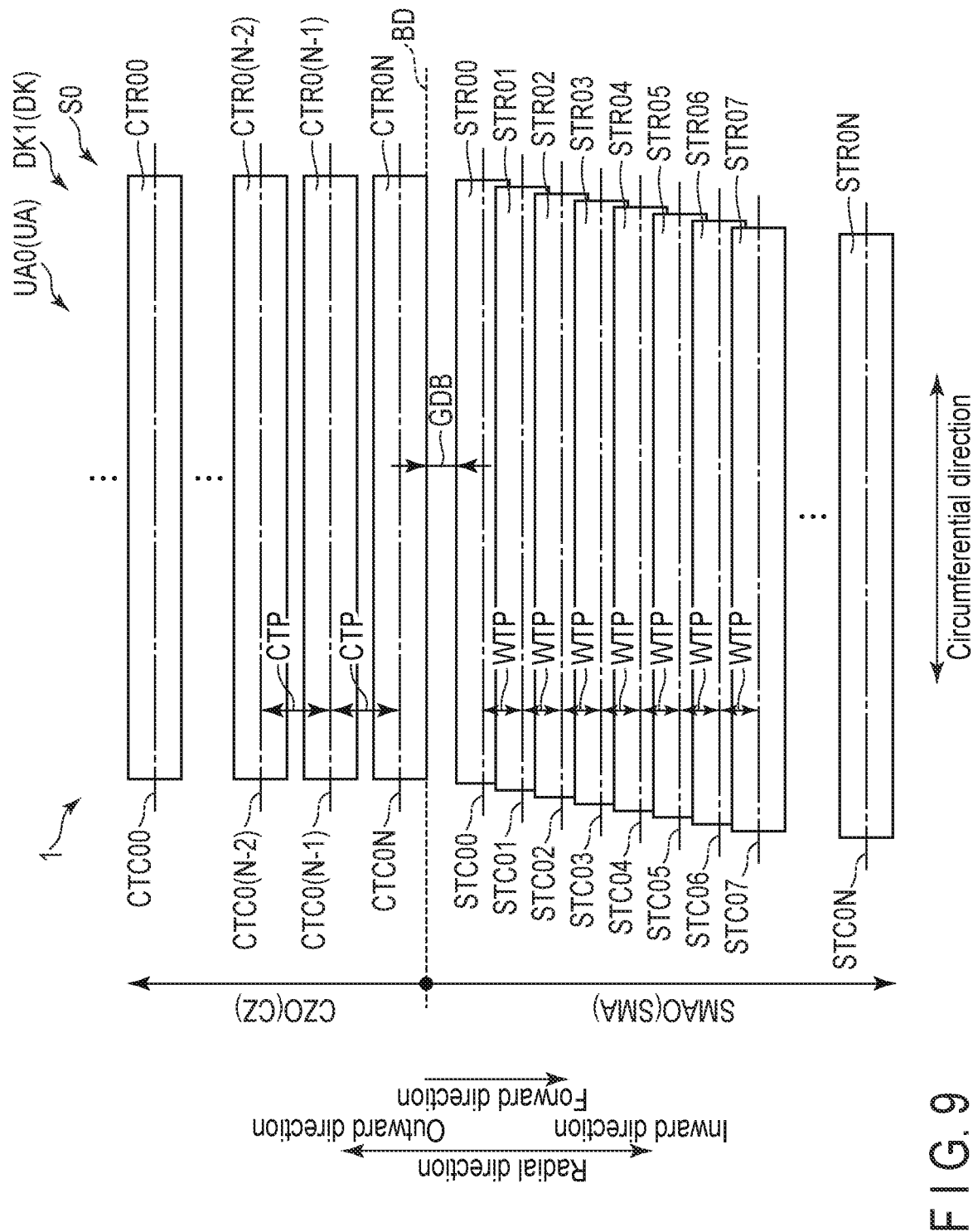
FIG. 9 is a diagram showing an example of the user data area according to the first embodiment.

FIG. 9 is a diagram showing an example of the user data area UA according to the first embodiment. FIG. 9 corresponds to FIGS. 2 and 5 through 8. For convenience of description, the example will be described below using the user data area UA0 of the recording surface SC of the disk DK1, but the same description can be given using the user data area of a recording surface other than the recording surface S0. FIG. 9 shows a conventional zone CZ0 (CZ) and a shingled recording area SMA0 (CZ) which are adjacent to each other in the radial direction. In FIG. 9, the conventional zone CZ0 is adjacent to the shingled recording area SMA0 in the outward direction. FIG. 9 shows a boundary BD between the conventional zone CZ0 and the shingled recording area SMA0. In the conventional zone CZ0 of FIG. 9, tracks CTR00, . . . , CTR0(N−2), CTR0(N−1) and CTR0N are normally recorded (or spaced) in the forward direction in the order described. The track CTR00 includes a track center CTC00, the track CTR0(N−2) includes a track center CTC0(N−2), the track CTR0(N−1) includes a track center CTC0(N−1), and the track CTR0N includes a track center CTC0N. In FIG. 9, the shingled recording area SMA0 includes an area GDB in which a guard cylinder, a guard track or the like is disposed to reduce adjacent track interference (ATI) such as a leakage flux from an adjacent band area or track. In the shingled recording area SMA0 of FIG. 9, tracks STR00, STR01, STR02, STR03, STR04, STR05, STR06, STR07, . . . , and STR0N are shingled-recorded in the forward direction in the order described at track pitches WTP. The track STR00 includes a track center STC00, the track STR01 includes a track center STC01, the track STR02 includes a track center STC02, the track STR03 includes a track center STC03, the track STR04 includes a track center STC04, the track STR05 includes a track center STC05, the track STR06 includes a track center STC06, the track STR17 includes a track center STC07, and the track STR0N includes a track center STC0N. In FIG. 9, for convenience of description, each track is shown like a rectangle extending in the circumferential direction with a particular track width, but in actuality, it is curved along the circumferential direction. Each track may also be shaped like a wave extending in the circumferential direction while varying in the radial direction.

In the example shown in FIG. 9, the recording area management unit 630 sets the conventional zone CZ0 and the shingled recording area SMA0 in the user data area UA0 of the recording surface S0 of the disk DK1. In this case, the read/write control unit 610 normally records a plurality of tracks CTR00 to CTR0N in the conventional zone CZ0 at intervals in the radial direction, and shingled-records a plurality of tracks STR00 to STR0N in the shingled recording area SMA0 in the forward direction.

Figure 10:
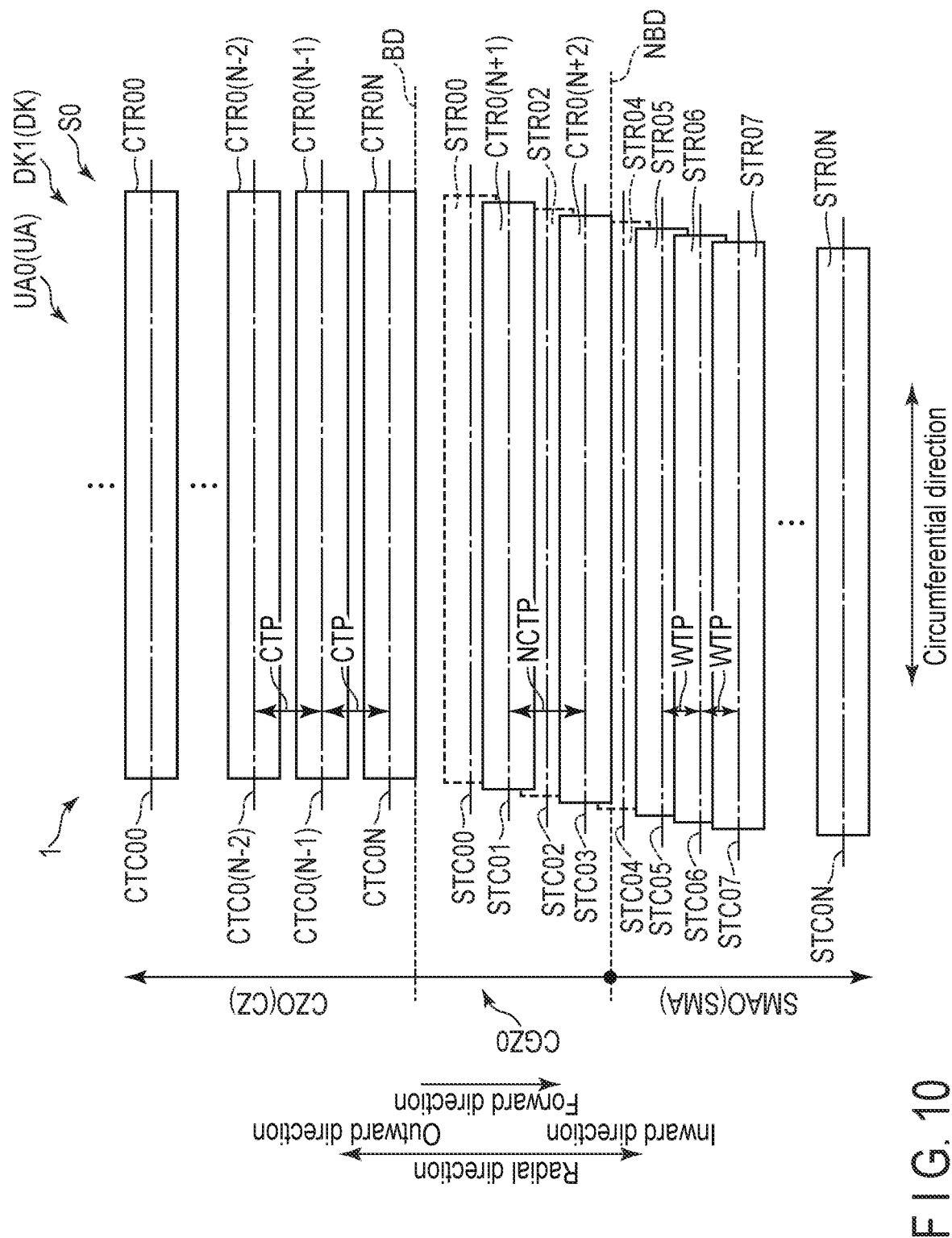
FIG. 10 is a diagram showing an example of the user data area according to the first embodiment.

FIG. 10 is a diagram showing an example of the user data area UA according to the first embodiment. FIG. 10 corresponds to FIGS. 2 and 5 through 9. FIG. 10 shows a boundary NBD between the conventional zone CZ0 and the shingled recording area SMA0 in the case where part of the shingled recording area SMA0 of the user data area UA0 shown in FIG. 9 is changed to the conventional zone CZ0 in accordance with the recording capacity (or area) of the conventional zone CZ of the invalid recording surface. In FIG. 10, the conventional zone CZ0 includes a changed area CGZ0. In FIG. 10, the changed area CGZ0 is located in the radial range from the track STR00 to the track STR04 shown in FIG. 9. In the example shown in FIG. 10, the changed area CGZ0 corresponds to a radial range from the boundary BD to the boundary NBD. Since, in FIG. 10, the shingled recording area SMA0 from the track STR00 to the track STR04 is changed to the conventional zone CZ0 (changed area CGZ0), the tracks STR00 to STR04 are erased. In the changed area CGZ0 of FIG. 10, the tracks CTRu(N+1) and CTR0(N+2) are normally recorded (spaced) in the forward direction in the order described at track pitches NCTP. The track pitch NCTP may be, for example, different from or the same as the normal recording track pitch CTP. For example, the track pitch NCTP is larger than the normal recording track pitch CTP. The track pitch NCTP is larger than the shingled recording track pitch WTP. For example, the track pitch NCTP corresponds to twice the shingled recording track pitch WTP. Note that the track pitch NCTP may be smaller than the normal recording track pitch CTP. In FIG. 10, for convenience of description, each track is shown like a rectangle extending in the circumferential direction with a particular track width, but in actuality, it is curved in the circumferential direction. Each track may also be shaped like a wave extending in the circumferential direction while varying in the radial direction.

In the example shown in FIG. 10, the recording area management unit 630 changes part of the shingled recording area SMAC of the user data area UA0 of the valid recording surface S0 to the convenional zone CZ0. In the changed area CGZ0 of the conventional zone CZ0 to which the shingled recording area SMA0 of the user data area UA0 is changed, the read/write control unit 610 positions the head HD at the track center STC1 to write the track CTR0(N+1), and positions the head HD at the track center STC03 at track pitch NCTP from the track center STC1 to write the track CTR0(N+2).

As shown in FIG. 10, when the recording area management unit 630 changes part of the shingled recording area SMA0 of the user data area UA0 of the valid recording surface S0 to the conventional zone CZ0, if a plurality of tracks to be shingled-recorded are written alternately, they can be used as a normal recording area such as a conventional zone CA without learning or rewriting particular servo data such as a postcode. The postcode includes a target position of the head HD arranged concentrically with the disk DK caused by a blur (repeating runouts: PRO) synchronized with the rotation of the disk DK when servo data is written to the disk, for example, data for correcting an error caused due to a distortion of a track with respect to the track center.

Figure 11:
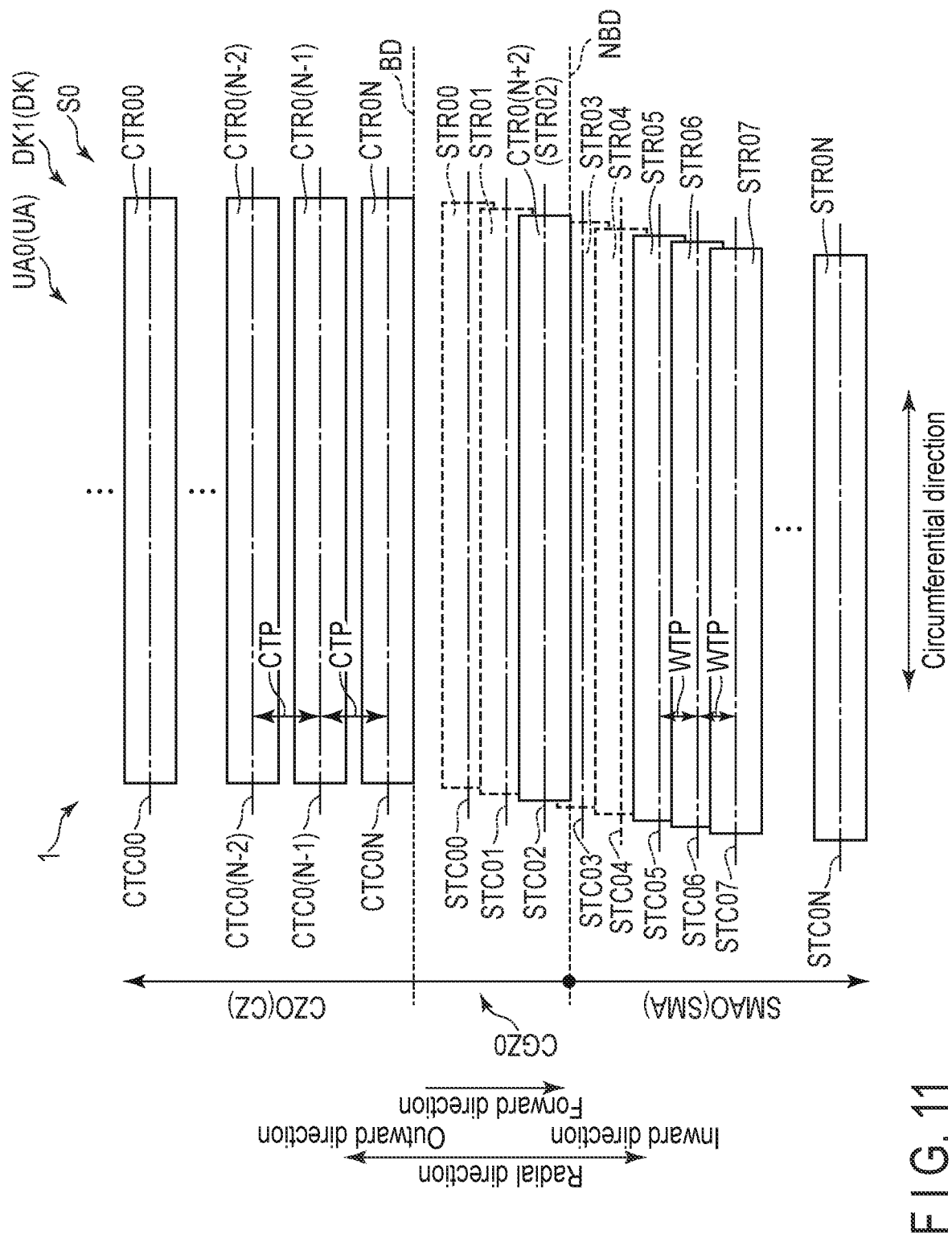
FIG. 11 is a diagram showing an example of the user data area according to the first embodiment.

FIG. 11 is a diagram showing an example of the user data area UA according to the first embodiment. FIG. 11 corresponds to FIGS. 2 and 5 through 9. In the changed area CGZ0 of FIG. 11, the track CTR0(N+1) is normally recorded at a track pitch that is larger than the track pitch NCTP shown in FIG. 10. In FIG. 11, for convenience of description, each track is shown like a rectangle extending in the circumferential direction with a particular track width, but in actuality, it is curved in the circumferential direction. Each track may also be shaped like a wave extending in the circumferential direction while varying in the radial direction.

In the example shown in FIG. 11, when the recording area management unit 630 changes part of the shingled recording area SMA0 of the user data area UA0 of the valid recording surface S0 to the conventional zone CZ0, the read/write control unit 610 positions the head HD at the track center STC2 to write the track CTR0(N+1) in the changed area CGZ0 of the conventional zone CZ0 to which the shingled recording area SMA0 of the user data area UA0 is changed.

Figure 12:
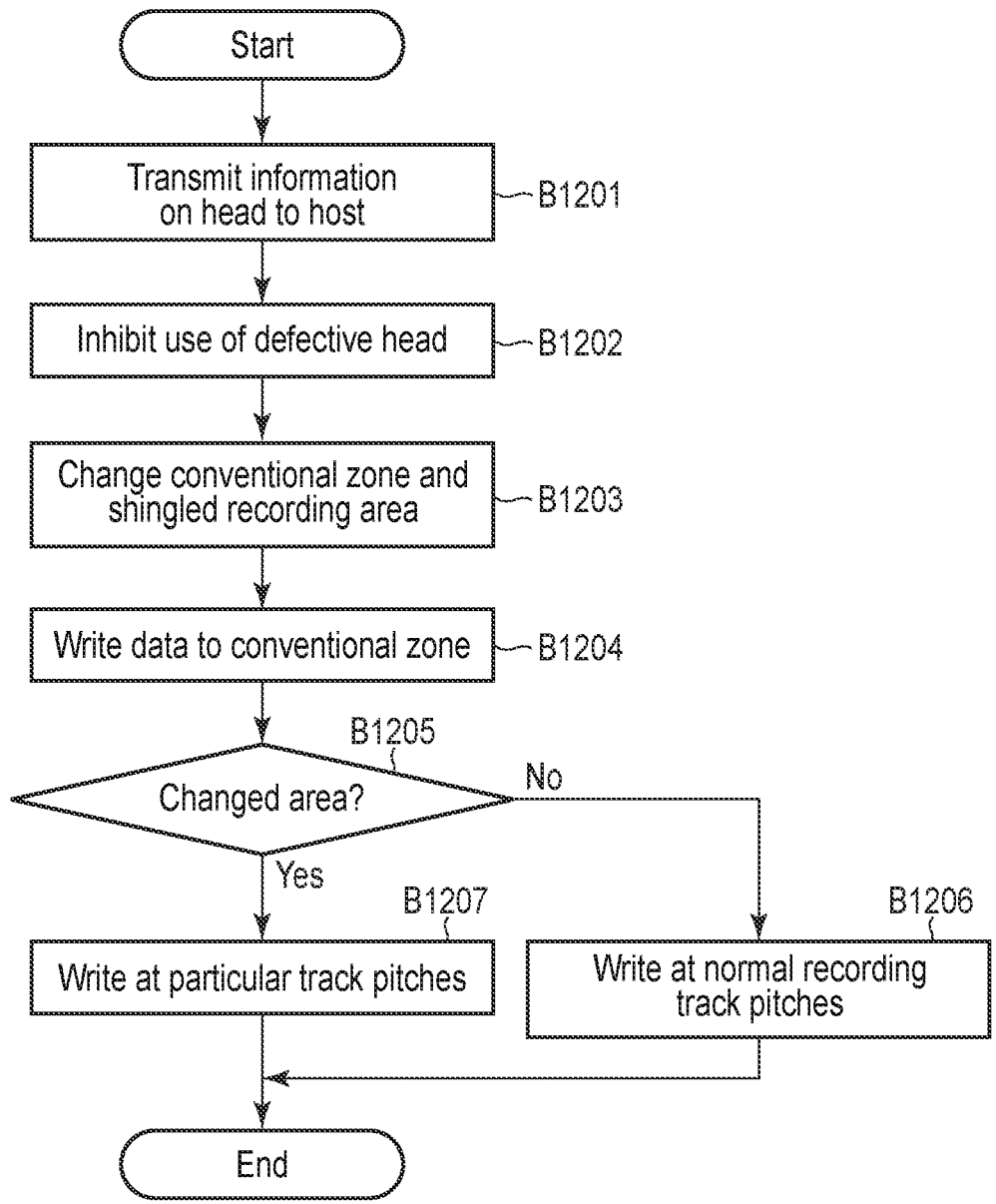
FIG. 12 is a flowchart showing an example of a Depop processing method according to the first embodiment.

FIG. 12 is a flowchart showing an example of a Depop process according to the first embodiment.

The MPU 60 transmits information on the head HD to the host 100 or the like (B1201). Upon receiving a command to inhibit the use of a defective head HD from the host 100 or the like, the MPU 60 inhibits the use of the defective head HD by the Depop function (B1202). The MPU 60 changes the shingled recording area SMA and the conventional zone CZ of the user data area UA of the valid recording surface (B1203). For example, the MPU 60 changes part of the shingled recording area SMA of the valid recording surface to the conventional zone CZ corresponding to the shingled recording area SMA in accordance with the recording capacity of the conventional zone CZ of the invalid recording surface.

The MPU 60 writes data to the conventional zone CZ (B1204). The MPU 60 determines whether the conventional zone CZ to which data is written is a changed area or not (B1205). If the MPU 60 determines that it is not a changed area (NO in B1205), it normally records a plurality of tracks in the conventional zone CZ at normal recording track pitches (B1206), and ends the process. If the MPU 60 determines that it is a changed area (YES in B1205), it normally records a plurality of tracks in the changed area at track pitches other than the normal recording track pitches (B1207), and ends the process. For example, the MPU 60 normally records a plurality of tracks in the changed area at track pitches that are greater than the normal recording track pitches. For example, when the MPU 60 writes a plurality of tracks to be overlaid in shingled recording in the changed area (normal recording), it positions the head HD at a plurality of target positions where the tracks can be written so as not to overlap their adjacent tracks within the target positions.

According to the first embodiment, when the Depop function inhibits the use of a defective head HD, the magnetic disk device 1 changes part of the shingled recording area SMA of the user data area UA on the valid recording surface to the conventional zone CZ in accordance with the recording capacity of the conventional zone CZ of the user data area UA on the invalid recording surface. In this case, when a plurality of tracks to be overlaid in shingled recording are written to the changed area of the conventional zone CZ to which the shingled recording area SMA of the user data area UA is changed (normal recording), the head HD is positioned at a plurality of target positions where the tracks can be written so as not to overlap their adjacent tracks within the target positions. Thus, when the use of a particular defective head HD is inhibited by the Depop function, the magnetic disk device 1 can prevent the total conventional zone capacity of the conventional zone CZ from decreasing. Therefore, the magnetic disk device 1 can be improved in its performance.

Next are descriptions of magnetic disk devices according to another embodiment and other modifications. In the embodiment and modifications, the same components as thobe of the foregoing first embodiment are denoted by the same reference symbols, and their detailed descriptions will be omitted.

(First Modification)

The magnetic disk device 1 according to a first modification to the first embodiment differs from the magnetic disk device 1 according to the first embodiment in the Depop processing method.

If the changed area of the conventional zone CZ to which the shingled recording area SMA of the user data area UA of the valid recording surface is changed is of such a size that no tracks can be written, the recording area management unit 630 expands the changed area to such a size that at least one track can be written.

Figure 13:
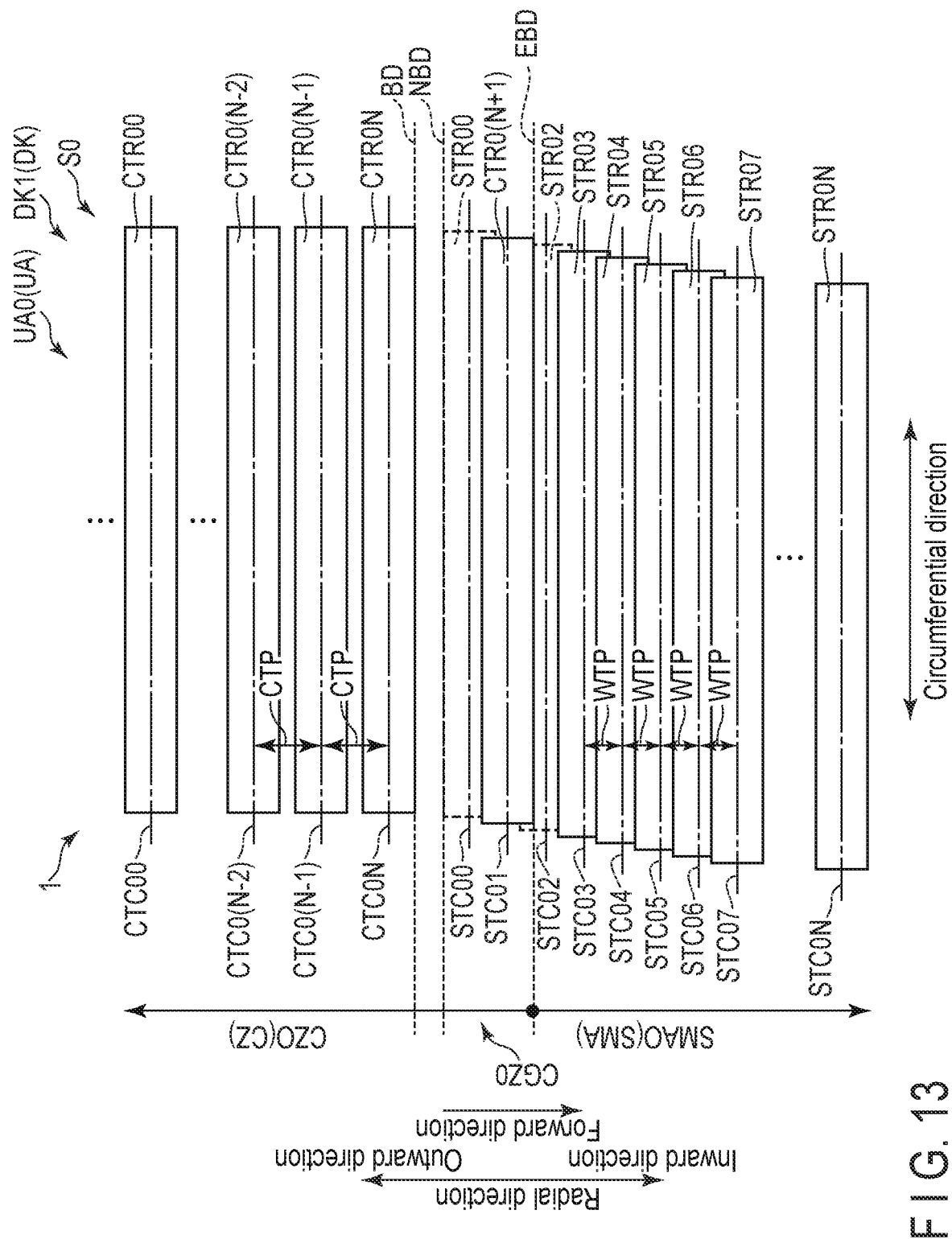
FIG. 13 is a diagram showing an example of a user data area according to a first modification to the first embodiment.

FIG. 13 is a diagram showing an example of the user data area UA according to the first modification. FIG. 13 corresponds to FIGS. 2 and 5 through 9. FIG. 13 shows a boundary EBD between the conventional zone CZ0 and the shingled recording area SMA0 in the case where the changed area CGZ0 is expanded. In FIG. 13, for convenience of description, each track is shown like a rectangle extending in the circumferential direction with a particular track width, but in actuality, it is curved in the circumferential direction. Each track may also be shaped like a wave extending in the circumferential direction while varying in the radial direction.

In the example shown in FIG. 13, the recording area management unit 630 expands the changed area CGZ0 in the radial direction when the changed area CGZ0 is of such a size that no tracks can be written. In this case, the recording area management unit 630 expands the changed area CGZ0 by changing a boundary NBD between the conventional zone CZ0 and the shingled recording area SMA0 to the boundary EBD.

According to the first modification, if the changed area of the conventional zone CZ to which the shingled recording area SMA of the user data area UA of the valid recording surface is changed is of such a size that no tracks can be written, the recording area management unit 630 expands the changed area to such a size that at least one track can be written. Therefore, the magnetic disk device 1 can be improved in its performance.

(Second Modification)

The magnetic disk device 1 according to a second modification to the first embodiment differs from the magnetic disk device 1 according to each of the first embodiment and the first modification in the Depop processing method.

The read/write control unit 610 performs a process of calculating correction data (which may be referred to as a learning process or learning hereinafter) based on a deviation of a radial position where the head HD is disposed from the target position.

The recording area management unit 630 changes part of the shingled recording area SMA of the user data area UA of the valid recording surface to the conventional zone CZ. In this case, in the changed area of the conventional zone CZ to which the shingled recording area SMA of the user data area UA is changed, the read/write control unit 610 learns at a radial position other than the target position of a plurality of tracks to be shingled-recorded and rewrites (or writes) particular servo data, such as a postcode corresponding to the radial position. Then, the read/write control unit 610 positions the head HD at the radial position to write the data (normal recording).

Figure 14:
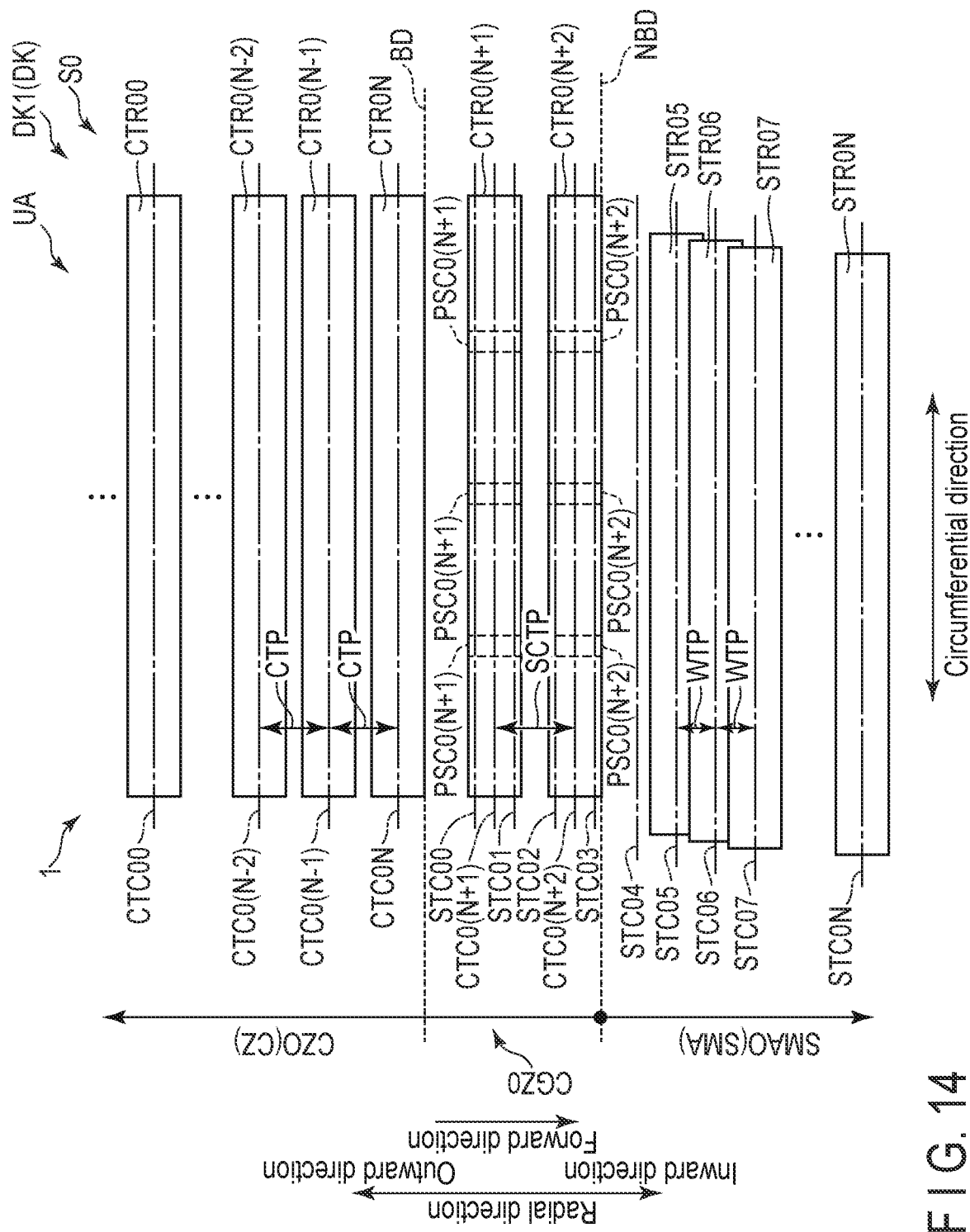
FIG. 14 is a diagram showing an example of a user data area according to a second modification to the first embodiment.

FIG. 14 is a diagram showing an example of the user data area UA according to the second modification. FIG. 14 corresponds to FIGS. 2 and 5 through 9. In the changed area CGZ0 of FIG. 14, the tracks CTR0(N+1) and CTR0(N+2) are normally recorded (spaced) in the order described at track pitches SCTP in the forward direction. The track pitches SCTP may be different from or the same as, for example, the track pitches CTP and NCTP. The track pitch SCTP is larger than the track pitch CTP. Note that the track pitch SCTP may be smaller than the track pitch CTP. The track CTR0(N+1) includes a track center CTC(N+1) and the track CTR0(N+2) includes a track center CTC0(N+2). The track center CTC0(N+1) is located between the track centers STC00 and STC01, and the track center CTC0N+2) is located between the track centers STC02 and STC03. That is, the track centers CTC0(N+1) and CTC0(N+2) coincide with none of the track centers of a plurality of tracks to be overwritten in shingled recording. The track CTR0(N+1) includes a plurality of postcodes PSC0(N+1) spaced in the circumferential direction. The track CTR0(N+2) includes a plurality of postcodes PSC0(N+2) spaced in the circumferential direction. In FIG. 14, for convenience of description, each track is shown like a rectangle extending in the circumferential direction with a particular track width, but in actuality, it is curved in the circumferential direction. Each track may also be shaped like a wave extending in the circumferential direction while varying in the radial direction.

In the example shown in FIG. 14, the recording area management unit 630 changes part of the shingled recording area SMA0 of the user data area UA0 of the valid recording surface to the conventional zone CZ0. In this case, in the changed area CGZ0 of the conventional zone CZ0 of the user data area UA0 to which the shingled recording area SMA0 is changed, the read/write control unit 610 learns at the track center CTC0(N+1) to rewrite the postcode PSC0(N+1), and positions the head HD at the track center CTC0N+1) to write the track CTR0(N+1) (normal recording).

The recording area management unit 630 changes part of the shingled recording area SMA0 of the user data area UA0 of the valid recording surface to the conventional zone CZ0. In this case, the read/write control unit 610 learns at the track center CTC0(N+2) spaced inward at track pitch SCTP from the track center CTC0(N+1) to rewrite the postcode PSC0 (N+1), and positions the head HD at the track center CTC0(N+2) to write the track CTR0(N+2) (normal recording).

According to the second modification, the recording area management unit 630 changes part of the shingled recording area SMA of the user data area UA on the valid recording surface to the conventional zone CZ. In this case, in the changed area of the conventional zone CZ to which the shingled recording area SMA of the user data area UA is changed, the magnetic disk device 1 learns at a radial position other than the target position of a plurality of tracks to be shingled-recorded to rewrite a postcode, and positions the head HD at the radial position to write it (normal recording). Therefore, the magnetic disk device 1 can be improved in its performance.

Second Embodiment

A magnetic disk device 1 according to a second embodiment differs from the magnetic disk device 1 according to each of the first embodiment, first modification and second modification in the configuration of a disk DK.

The disk DK is further allocated a memory area MDA that differs from the user data area UA. The memory region MDA is an area to which no LBA is applied. Data is written to the memory area MDA in normal recording. In other words, the memory area MDA corresponds to a normal recording area. The memory area MDA corresponds to, for example, a media cache.

The read/write control unit 610 normally records data in the memory area MDA of the disk DK in response to a command or the like from the host 100. The read/write control unit 610 normally records data randomly and sequentially in the memory area MDA, for example. For example, the read/write control unit 610 writes a plurality of tracks to the memory area MDA at normal recording track pitches as shown in FIG. 3.

When the head/LBA management unit 620 inhibits the use of a particular head HD by the Depop function, the recording area management unit 630 changes (or sets) part of the memory area MDA to a conventional zone CZ on the recording surface of at least one disk DK. In other words, when the head/LBA management unit 620 inhibits the use of a particular head HD by the Depop function, the recording area management unit 630 changes (or sets) part of the recording capacity of the memory area MDA to the recording capacity of a conventional zone CZ on the recording surface of at least one disk DK.

In accordance with the recording capacity (or the area) of the conventional zone CZ of an invalid recording surface of a disk DK corresponding to a defective head HD the use of which is inhibited by the head/LBA management unit 620 by the Depop function, the recording area management unit 630 changes (or sets) part of the memory area MDA to a conventional zone CZ on the valid recording surface of at least one disk DK. In other words, when the head/LBA management unit 620 inhibits the use of a particular defective head HD by the Depop function, the recording area management unit 630 changes (or sets) part of the memory area MDA to a conventional zone CZ on the valid recording surface of at least one disk DK in such a manner that the total conventional zone capacities before and after the use of the head HD is inhibited coincide with each other.

For example, in accordance with the recording capacity (or the area) of the conventional zone CZ of an invalid recording surface of a disk DK corresponding to a defective head HD the use of which is inhibited by the head/LBA management unit 620 by the Depop function, the recording area management unit 630 changes part of a plurality of memory areas MDA corresponding to their respective valid recording surfaces to a plurality of conventional zones CZ corresponding to their respective memory areas MDA. In accordance with the recording capacity (or the area) of the conventional zone CZ of an invalid recording plane of a disk DK corresponding to a defective head HD the use of which is inhibited by the head/LBA management unit 620 by the Depop function, the recording area management unit 630 may uniformly change part of a plurality of memory areas MDA corresponding to their respective valid recording surfaces to a plurality of conventional zones CZ corresponding to their respective memory areas MDA. Furthermore, in accordance with the recording capacity (or the area) of the conventional zone CZ of the invalid recording surface of a disk DK corresponding to a defective head HD the use of which is inhibited by the head/LBA management unit 620 by the Depop function, the recording area management unit 630 may nonuniformly change part of a plurality of memory areas MDA corresponding to their respective valid recording surfaces to a plurality of conventional zones CZ corresponding to their respective memory areas MDA.

For example, the recording area management unit 630 changes part of the memory areas MDA of a plurality of valid recording surfaces corresponding to the recording capacity (or the area) of the conventional zone CZ of an invalid recording surface of a disk DK corresponding to a defective head HD the use of which is inhibited by the head/LBA management unit 620 by the Depop function, to a plurality of conventional zones CZ. The recording area management unit 630 may uniformly change part of the memory areas MDA of a plurality of valid recording surfaces corresponding to the recording capacity (or the area) of the conventional zone CZ of an invalid recording surface of a disk DK corresponding to a defective head HD the use of which is inhibited by the head/LBA management unit 620 by the Depop function. The recording area management unit 630 may nonuniformly change part of the memory areas MDA of a plurality of valid recording surfaces corresponding to the recording capacity (or the area) of the conventional zone CZ of an invalid recording surface of a disk DK corresponding to a defective head HD the use of which is inhibited by the head/LBA management unit 620 by the Depop function.

For example, in accordance with the recording capacity of the conventional zone CZ of an invalid recording surface of a disk DK corresponding to a defective head HD the use of which is inhibited by the head/LBA management unit 620 by the Depop function, the recording area management unit 630 changes part of the memory area MDA corresponding to one of a plurality of valid recording surfaces to a conventional zone CZ corresponding to the memory area MDA.

FIG. 15 is a diagram showing an example of the memory area MDA according to the second embodiment. FIG. 15 corresponds to FIGS. 2 and 5. In FIG. 15, the recording surface (front surface) S0 includes a user data area UA0 and a memory area MDA0. The recording surface (back surface) S1 includes a user data area UA1 and a memory area MDA1. The recording surface (front surface) S2 includes a user data area UA2 and a memory area MDA2. The recording surface (back surface) S3 includes a user data area UA3 and a memory area MDA3. The recording surface (front surface) S(N−1) includes a user data area UA(N−1) and a memory area MDA(N−1). The recording surface (back surface) SN includes a user data area UAN and a memory area MDAN. FIG. 15 also shows a radial position RP11 and a radial position RP12 that is separated in the radial direction from the radial position RP11. In FIG. 15, the memory areas MDA0 to MDAN correspond to a radial range MDR1 from the radial position RP11 to the radial position RP12. In other words, in FIG. 15, the radial ranges MDR1 of the memory areas MDA0 to MDAN are the same.

In the example shown in FIG. 15, the recording area management unit 630 sets a shingled recording area SMA0 with a radial range SRR1, a conventional zone CZ0 with a radial range CRR1 located outside the shingled recording area SMAC, and a memory area MDA0 with a radial range MDR1 in the user data area UA0 on the front surface S0 of a disk DK1. The recording area management unit 630 sets a shingled recording area SMA1 with a radial range SRR1, a conventional zone CZ1 with a radial range CRR1 located outside the shingled recording area SMA1, and a memory area MDA1 with a radial range MDR1 in the user data area UA1 on the back surface S1 of the disk DK1. The recording area management unit 630 sets a shingled recording area SMA2 with a radial range SRR1, a conventional zone CZ2 with a radial range CPR1 located outside the shingled recording area SMA2, and a memory area MDA2 with a radial range MDR1 in the user data area UA2 on the front surface S2 of a disk DK2. The recording area management unit 630 sets a shingled recording area SMA3 with a radial range SRR1, a conventional zone CZ3 with a radial range CRR1 located outside the shingled recording area SMA3, and a memory area MDA3 with a radial range MDR1 in the user data area UA3 on the back surface S3 of the disk DK2. The recording area management unit 630 sets a shingled recording area SMA(N−1) with a radial range SSR1, a conventional zone CZ(N−1) with a radial range CRR1 located outside the shingled recording area SMA(N−1), and a memory area MDA(N−1) with a radial range MDR1 in the user data area UA(N−1) of the front surface S of a disk DKN. The recording area management unit 630 sets a shingled recording area SMAN with a radial range SRR1, a conventional zone CZN with a radial range CRR1 located outside the shingled recording area SMAN, and a memory area MDAN with a radial range MDR1 in the user data area UAN on the front surface SN of the disk DKN.

FIG. 16 is a schematic diagram showing an example of the memory area MDA in the case where the Depop function according to the second embodiment is performed. FIG. 16 corresponds to FIG. 15. In FIG. 16, the Depop function prevents the use of a head HD2. That is, in FIG. 16, the head HD2 neither reads nor writes data from or to the recording surface S2. FIG. 16 shows a radial position RP13 and a radial position RP14 between the radial positions RP11 and RP12. In FIG. 16, the conventional zones CZ0, CZ1, and CZ3 to CZN correspond to a radial range CRR4 from the radial position RP1 to the radial position RP13. In other words, the radial ranges CRR4 of the conventional zones CZ0, CZ1, and CZ3 to CZN are the same. The radial range CRR4 is larger than the radial range CRR1. In other words, the conventional zones CZ0, CZ1, and CZ3 to CZN shown in FIG. 16 are larger than the conventional zones CZ0, CZ1, and CZ3 to CZN shown in FIG. 15, respectively. The total of areas corresponding to differences between the radial ranges CRR1 and CRR4 in the conventional zones CZ0, CZ1, and CZ3 to CZN is an area corresponding to the recording capacity of the conventional zone CZ2. In other words, an area corresponding to a difference between the radial ranges CRR1 and CRR4 in each of the conventional zones CZ0, CZ1, and CZ3 to CZN is an area corresponding to a value obtained by dividing the recording capacity of the conventional zone CZ2 by the number of each of the valid recording surfaces S0, S1, and S3 to SN. In FIG. 16, the memory areas MDA0, MDA1, and MDA3 to MDAN correspond to the radial range MDR2 from the radial position RP14 to the radial position RP12. In other words, the radial ranges MDR2 of the memory area MDA1, MDA1, and MDA3 to MDAN are the same. The radial range MDR2 is smaller than the radial range MDR1. In other words, the memory areas MDA0, MDA, and MDA3 to MDAN shown in FIG. 16 are smaller than the memory areas MDA0, MDA1, and MDA3 to MDAN shown in FIG. 15, respectively. The total of areas corresponding to differences between the radial ranges MDR1 and MDR2 in the memory areas MDA0, MDA1, and MDA3 to MDAN corresponds to the recording capacity of the conventional zone CZ2. In other words, an area corresponding to a difference between the radial ranges MDR1 and MDR2 in each of the memory areas MDA0, MDA1, and MDA3 to MDAN is an area corresponding to a value obtained by dividing the recording capacity of the conventional zone CZ2 by the number of each of the valid recording surfaces S0, S1, and S3 to SN.

In the example shown in FIG. 16, in accordance with the recording capacity of the conventional zone CZ2 on the invalid recording surface S2, the recording area management unit 630 uniformly changes part of each of the memory areas MDA0, MDA1, and MDA3 to MDAN of each of the valid recording surfaces S0, S1, and S3 to SN to its corresponding one of the conventional zones CZ0, CZ1, and CZ3 to CZN of the valid recording surfaces S0, S1, and S3 to SN. That is, the recording area management unit 630 decreases each of the memory areas MDA0, MDA1, and MDA3 to MDAN of the valid recording surfaces S0, S1, and 33 to SN by an area corresponding to a value obtained by dividing the recording capacity of the conventional zone CZ2 on the invalid recording surface S2 by the number of the valid recording surfaces S0, S1, and S3 to SN, and increases each of the conventional zones CZ0, CZ1, and CZ3 to CZN of the valid recording surfaces S0, S1, and S3 to SN by an area corresponding to a value obtained by dividing the recording capacity of the conventional zone CZ2 on the invalid recording surface S2 by the number of the valid recording surfaces S0, S1, and S3 SN. In the example shown in FIG. 16, the Depop function prevents the use of a head HD other than the head HD2. Even when the use of a head HD other than the head HD2 is inhibited by the Depop function, the same process as in the case where the use of the head H2 is inhibited by the Depop function can be performed.

Figure 17:
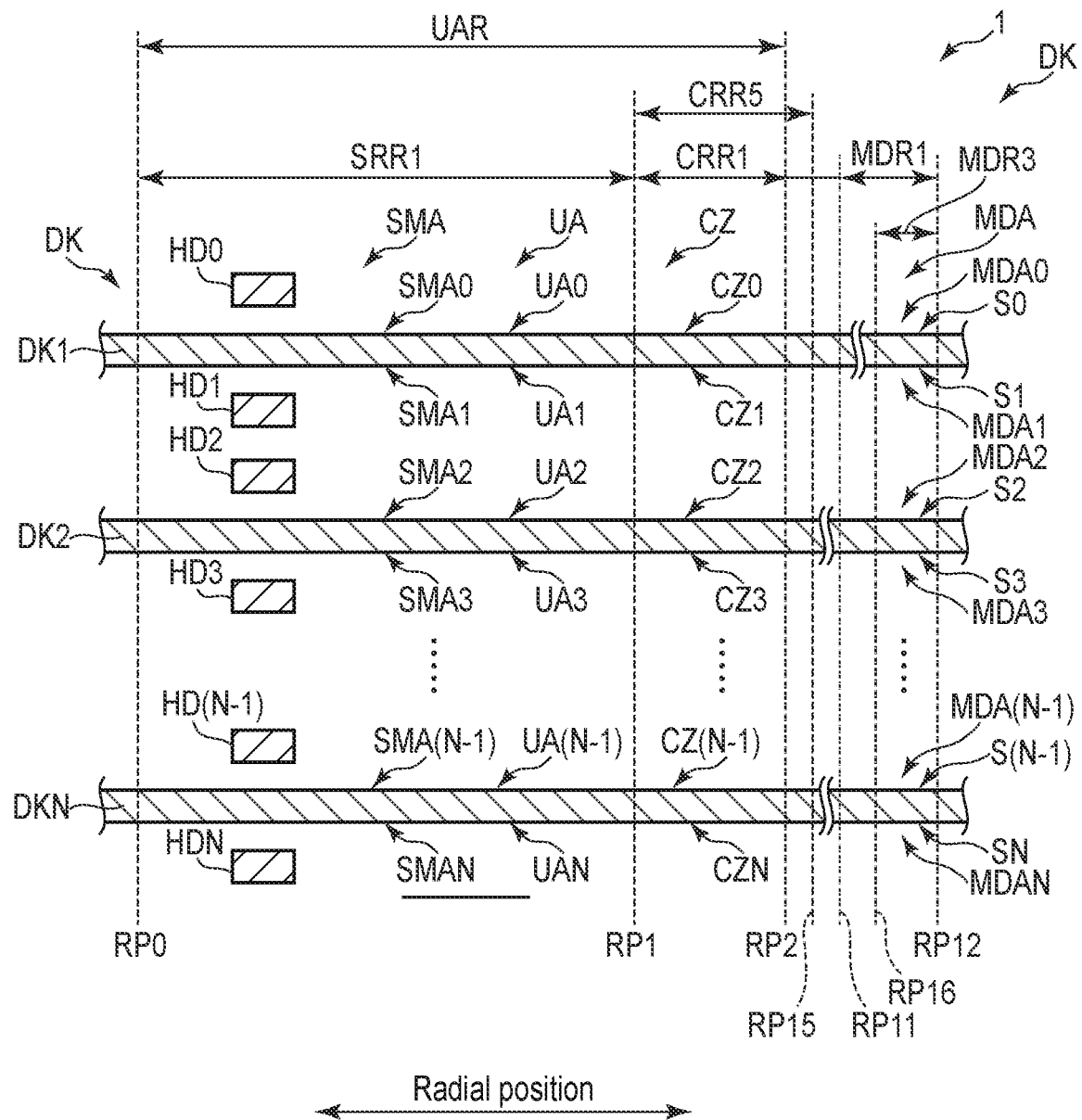
FIG. 17 is a schematic diagram showing another example of the memory area when the Depop function according to the second embodiment is performed.

FIG. 17 is a schematic diagram showing an example of the memory area MDA in the case where the Depop function according to the second embodiment is performed. FIG. 17 corresponds to FIG. 15. In FIG. 17, the Depop function prevents the use of the head HD2. That is, in FIG. 17, the head HD2 neither reads nor writes data from or to the recording surface S2. FIG. 17 shows a radial position RP15 and a radial position RP16 between the radial positions RP11 and RP12. In FIG. 17, the conventional zone CZ0 corresponds to a radial range CRR5 from the radial position RP1 to the radial position RP15. The radial range CRR5 is larger than the radial range CRR1. The radial range CRR5 is larger than the radial range CRR4 shown in FIG. 16. In other words, the conventional zone CZ0 shown in FIG. 17 is larger than the conventional zone CZ0 shown in FIG. 15.

An area corresponding to a difference between the radial ranges CRR1 and CRR5 in the conventional zone CZ0 is an area corresponding to the recording capacity of the conventional zone CZ2. In FIG. 17, the memory area MDA0 corresponds to a radial range MDR3 from the radial position RP16 to the radial position RP12. The radial range MDR3 is smaller than the radial range MDR1. In other words, the memory area MDA0 shown in FIG. 17 is smaller than the memory area MDA0 shown in FIG. 15. The radial range MDR3 is smaller than the radial range MDR2 shown in FIG. 16. An area corresponding to a difference between the radial ranges MDR1 and MDR3 in the memory area MDA0 is an area corresponding to the recording capacity of the conventional zone CZ2.

In the example shown in FIG. 17, the recording area management unit 630 changes part of the memory area MDA0 of a valid recording surface S0 corresponding to the recording capacity of the conventional zone CZ2 on the invalid recording surface S2 to the conventional zone CZ0 on the valid recording surface S0. In other words, the recording area management unit 630 decreases the memory area MDA0 on the valid recording surface S0 by an area corresponding to the recording capacity of the conventional zone CZ2 on the invalid recording surface S2, and increases the conventional zone CZ0 on the valid recording surface S0 by an area corresponding to the recording capacity of the conventional zone CZ2 on the invalid recording surface S2. In the example shown in FIG. 17, the Depop function prevents the use of the head HD2. Even though the Depop function prevents the use of a head other than the head HD2, the same process as in the case where the Depop function prevents the use of the head HD2, can be performed. In the example shown in FIG. 17, part of the memory area MDA0 on the valid recording surface S0 is changed to a conventional zone CZ0 on the valid recording surface S0 in accordance with the recording capacity of the conventional zone CZ2 on the valid recording surface S2. Even though the memory area MDA on a valid recording surface other than the valid recording surface S0 is changed to a conventional zone CA corresponding to a valid recording surface other than the valid recording surface S0 in accordance with the recording capacity of the conventional zone CZ2 on the invalid recording surface S2, the same process as in the case where part of the memory area MDR0 on the valid recording surface is changed to a conventional zone CZ0 on the valid recording surface S0, can be performed.

Figure 18:
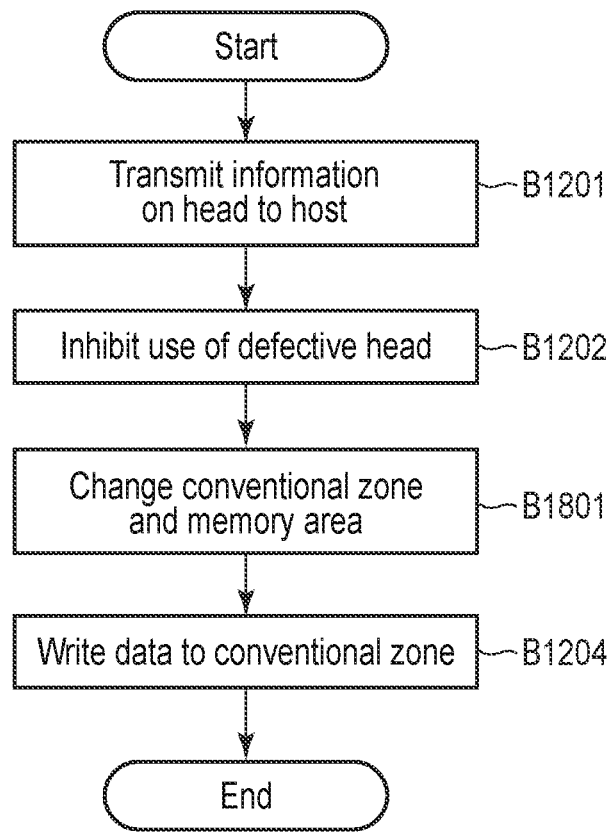
FIG. 18 is a flowchart showing an example of a Depopp processing method according to the second embodiment.

FIG. 18 is a flowchart showing an example of a Depop process according to the second embodiment.

The MPU 60 transmits information on the head HD to the host 100 or the like (B1201). Upon receiving a command to inhibit the use of a defective head HD from the host 100 or the like, the MPU 60 inhibits the use of the defective head HD by the Depop function (B1202). The MPU 60 changes the memory area MDA and the conventional zone CE of the user data area UA of the valid recording surface (B1801). For example, the MPU 60 changes part of the memory area MDA on the valid recording surface to the conventional zone CZ in accordance with the recording capacity of the conventional zone CZ on the invalid recording surface. The MPU 60 writes data to the conventional zone CZ (B1204), and ends the process.

According to the second embodiment, when the Depop function inhibits the use of a defective head HD, the magnetic disk device 1 changes part of the memory area MDA on the valid recording surface to the conventional zone CZ in accordance with the recording capacity of the conventional zone CZ of the user data area UA on the invalid recording surface. Therefore, the magnetic disk device 1 can be improved in its performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a plurality of disks including a first area to which data is randomly written in normal recording and to which an LBA is added, and a second area to which data is written in shingled recording to write a plurality of tracks overlaid in a radial direction and to which an LBA is added;
   a plurality of heads with which data is written to each of the disks and data is read from each of the disks; and
   a controller which writes data to the first area in the normal recording, writes data to the second area in the shingled recording, and changes the first area in accordance with a first recording capacity of a first recording surface in each of the disks, which corresponds to a first head of the heads, when the first head is inhibited from being used.

2. The magnetic disk device of claim 1, wherein the controller changes a third area in the second area of each of the disks, which corresponds to the first recording capacity, to the first area.

3. The magnetic disk device of claim 1, wherein the controller changes a third area in the second area on a second recording surface of each of the disks, which corresponds to the first recording capacity, to the first area on the second recording surface.

4. The magnetic disk device of claim 2, wherein the controller writes data in the normal recording to a first target position to write data in the shingled recording in the first area corresponding to the third area.

5. The magnetic disk device of claim 4, wherein the controller writes data in the normal recording to a second target position which is separated in a radial direction from the first target position at a track pitch two or more times as long as a track pitch in the shingled recording.

6. The magnetic disk device of claim 2, wherein the controller rewrites a postcode at a second target position other than a first target position to write data in the shingled recording in the first area corresponding to the third area.

7. The magnetic disk device of claim 1, wherein:
   the disks further includes a third area to which data is written in normal recording and to which no LBA is added; and
   the controller changes a fourth area of the third area of each of the disks, which corresponds to the first recording capacity, to the first area.

8. The magnetic disk device of claim 1, wherein:
   the disks further includes a third area to which data is written in normal recording and to which no LBA is added; and
   the controller changes a fourth area of the third area on a second recording surface in each of the disks, which corresponds to the first recording capacity, to the first area on the second recording surface.

9. A magnetic disk device comprising:
   a first disk including a first recording surface including a first area to which data is randomly written in normal recording and to which an LBA is added and a second area to which data is written in shingled recording to write a plurality of tracks overlaid in a radial direction and to which an LBA is added, and a second recording surface opposed to the first recording surface and including a third area to which data is randomly written in normal recording and to which an LBA is added and a fourth area to which data is written in shingled recording to write a plurality of tracks overlaid in the radial direction and to which an LBA s added;
   a second disk including a third recording surface including a fifth area to which data is randomly written in normal recording and to which an LBA is added and a sixth area to which data is written in shingled recording to write a plurality of tracks overlaid in the radial direction and to which an LBA is added, and a fourth recording surface opposed to the third recording surface and including a seventh area to which data is randomly written in normal recording and to which an LBA is added and an eighth area to which data is written in shingled recording to write a plurality of tracks overlaid in the radial direction and to which an LBA is added;
   a first head with which data is written to the first recording surface;
   a second head with which data is written to the second recording surface;
   a third head with which data is written to the third recording surface;
   a fourth head with which data is written to the fourth recording surface; and
   a controller which changes a ninth area of the fourth area to the third area, changes a tenth area of the sixth area to the fifth area, and changes an eleventh area of the eighth area to the seventh area in accordance with a first recording capacity of the first area when the first head is inhibited from being used.

10. The magnetic disk device of claim 9, wherein the first recording capacity corresponds to a total of a second recording capacity of the ninth area, a third recording capacity of the tenth area, and a fourth recording capacity of the eleventh area.

11. The magnetic disk device of claim 10, wherein the controller writes data in the normal recording by the second head to a first target position to write data in the shingled recording in the third area corresponding to the ninth area, writes data in the normal recording by the third head to a second target position to write data in the shingled recording in the fifth area corresponding to the tenth area, and writes data in the normal recording by the fourth head to a third target position to write data in the shingled recording in the seventh area corresponding to the eleventh area.

12. The magnetic disk device of claim 10, wherein the controller writes a postcode, which corresponds to a second target position other than the first target position, by the second head to the second target position to write data in the shingled recording in the third area corresponding to the ninth area, writes a postcode, which corresponds to a fourth target position other than the third target position, by the third head to the fourth target position to write data in the shingled recording in the fifth area corresponding to the tenth area, and writes a postcode, which corresponds to a sixth target position other than the fifth target position, by the fourth head to the sixth target position to write data in the shingled recording in the seventh area corresponding to the eleventh area.

13. A Depop processing method which is applied to a magnetic disk device including a plurality of disks including a first area to which data is randomly written in normal recording and to which an LBA is added and a second area to which data is written in shingled recording to write a plurality of tracks overlaid in a radial direction and to which an LBA is added, and a plurality of heads with which data is written to each of the disks and data is read from each of the disks, the method comprising:
writing data to the first area in the normal recording;
writing data to the second area in the shingled recording; and
changing the first area in accordance with a first recording capacity of a first recording surface in each of the disks, which corresponds to a first head of the heads, when the first head is inhibited from being used.

14. The Depop processing method of claim 13, further comprising changing a third area in the second area of each of the disks, which corresponds to the first recording capacity, to the first area.

15. The Depop processing method of claim 13, further comprising changing a third area in the second area on a second recording surface of each of the disks, which corresponds to the first recording capacity, to the first area on the second recording surface.

16. The Depop processing method of claim 14, further comprising writing data in the normal recording to a first target position to write data in the shingled recording in the third area.

17. The Depop processing method of claim 16, further comprising writing data, in the normal recording, to a second target position which is separated in a radial direction from the first target position at a track pitch two or more times as long as a track pitch in the shingled recording.

18. The Depop processing method of claim 14, further comprising rewriting a postcode at a second target position other than a first target position to write data in the shingled recording in the third area.

19. The Depop processing method of claim 13, wherein:
the disks further includes a third area to which data is written in normal recording and to which no LBA is added; and
the method further comprises changing a fourth area of the third area of each of the disks, which corresponds to the first recording capacity, to the first area.

20. The Depop processing method of claim 13, wherein:
the disks further includes a third area to which data is written in normal recording and to which no LBA is added; and
the method further comprises changing a fourth area of the third area on a second recording surface in each of the disks, which corresponds to the first recording capacity, to the first area on the second recording surface.

* * * * *